US011139573B2

(12) United States Patent
Schay et al.

(10) Patent No.: US 11,139,573 B2
(45) Date of Patent: Oct. 5, 2021

(54) DUAL-BAND GPS/IFF ANTENNA

(71) Applicant: BAE Systems Information and Electronic Systems Integration Inc., Nashua, NH (US)

(72) Inventors: Gary A. Schay, Stony Brook, NY (US); John Cosenza, Coram, NY (US); Michael S. Murphy, Centerport, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/758,308

(22) PCT Filed: Oct. 30, 2017

(86) PCT No.: PCT/US2017/058960
§ 371 (c)(1),
(2) Date: Apr. 22, 2020

(87) PCT Pub. No.: WO2019/088964
PCT Pub. Date: May 9, 2019

(65) Prior Publication Data
US 2020/0343638 A1 Oct. 29, 2020

(51) Int. Cl.
*H01Q 5/40* (2015.01)
*H01Q 5/307* (2015.01)
(Continued)

(52) U.S. Cl.
CPC .............. *H01Q 5/40* (2015.01); *H01Q 5/307* (2015.01); *H01Q 9/0407* (2013.01); *H01Q 9/32* (2013.01); *H01Q 1/27* (2013.01); *H01Q 1/42* (2013.01)

(58) Field of Classification Search
CPC .......... H01Q 1/27; H01Q 1/42; H01Q 1/1285; H01Q 5/40; H01Q 5/321; H01Q 5/307; H01Q 9/36; H01Q 9/0407; H01Q 9/32
See application file for complete search history.

(56) References Cited

U.S. PATENT DOCUMENTS 6,160,512 A 12/2000 Descos et al.
6,191,747 B1 * 2/2001 Cosenza .............. H01Q 1/1285
343/713
(Continued)

OTHER PUBLICATIONS

International Search Report, PCT/US17/58960, dated Aug. 8, 2018, 8 pages.

*Primary Examiner* — Lam T Mai
(74) *Attorney, Agent, or Firm* — Scott J. Asmus; Maine Cernota & Rardin

(57) ABSTRACT

An assembly comprising a horizontal GPS patch antenna element and a vertical IFF antenna element providing simultaneous high performance IFF communication and GPS reception with minimal IFF to GPS interference. The IFF element can be a monopole element. A second monopole co-linear with the IFF element can provide simultaneous UHF communication. In embodiments, the assembly is a blade that can replace an existing IFF blade on an aircraft or other asset. Separate IFF and GPS connectors can be provided, or a single connecter can be shared using an integral diplexer. Embodiments include a GPS preamplifier integral with the blade. In other embodiments, the IFF element is an annular slot transponder that is centered on the GPS patch element. System embodiments include bandpass filters and/ or GPS blanking to further protect the GPS receiver from IFF transmissions.

20 Claims, 21 Drawing Sheets

(51) Int. Cl.
*H01Q 9/04* (2006.01)
*H01Q 9/32* (2006.01)
*H01Q 1/27* (2006.01)
*H01Q 1/42* (2006.01)

(56) References Cited

U.S. PATENT DOCUMENTS

| | | |
|---|---|---|
| 8,686,918 B1 | 4/2014 | Diaz |
| 2007/0103375 A1 | 5/2007 | Laubner et al. |
| 2007/0159399 A1 | 7/2007 | Perunka et al. |
| 2008/0266181 A1 | 10/2008 | Ying |
| 2011/0150014 A1 | 6/2011 | Alexopoulos et al. |
| 2016/0344448 A1* | 11/2016 | Herbsommer ........... H04B 3/52 |
| 2019/0140354 A1* | 5/2019 | Astakhov ............. H01Q 9/0414 |
| 2019/0305429 A1* | 10/2019 | Ying ..................... H01Q 23/00 |

* cited by examiner

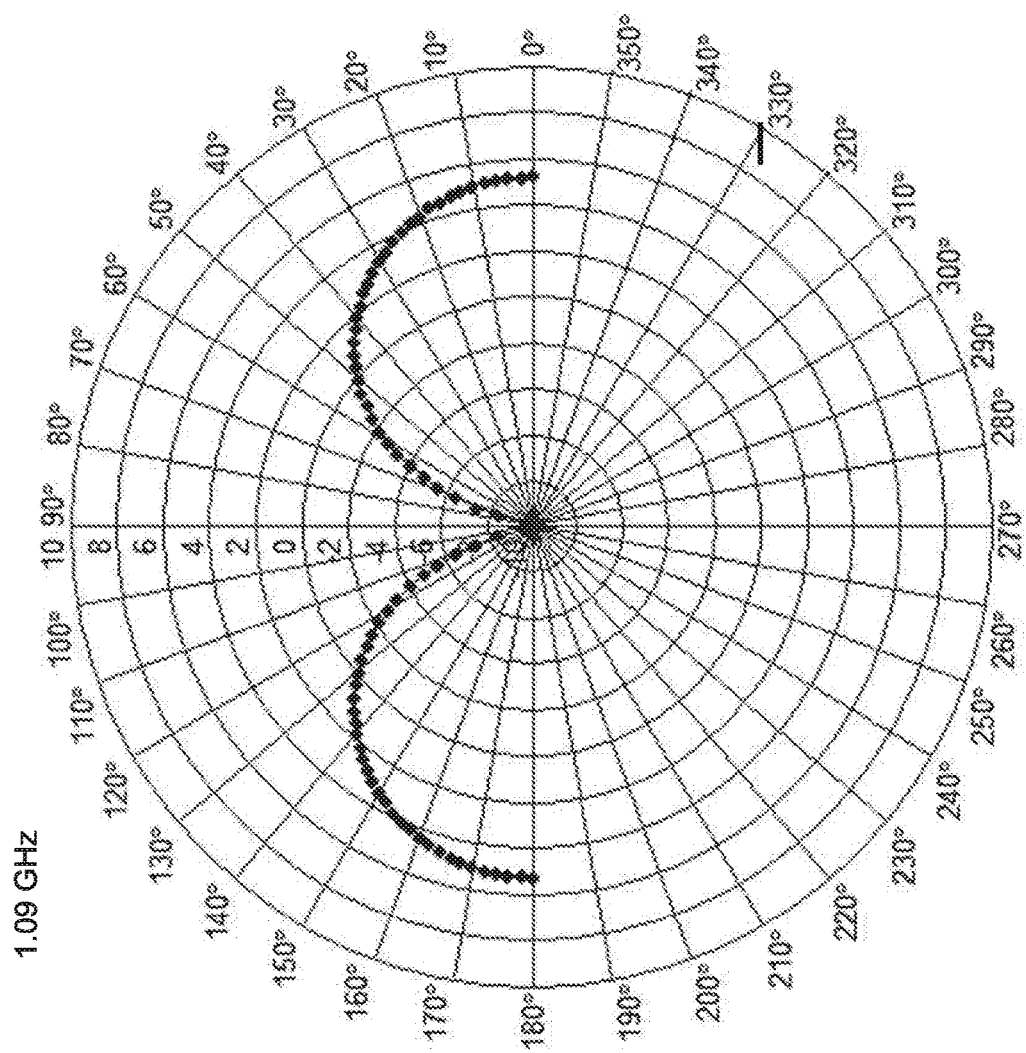

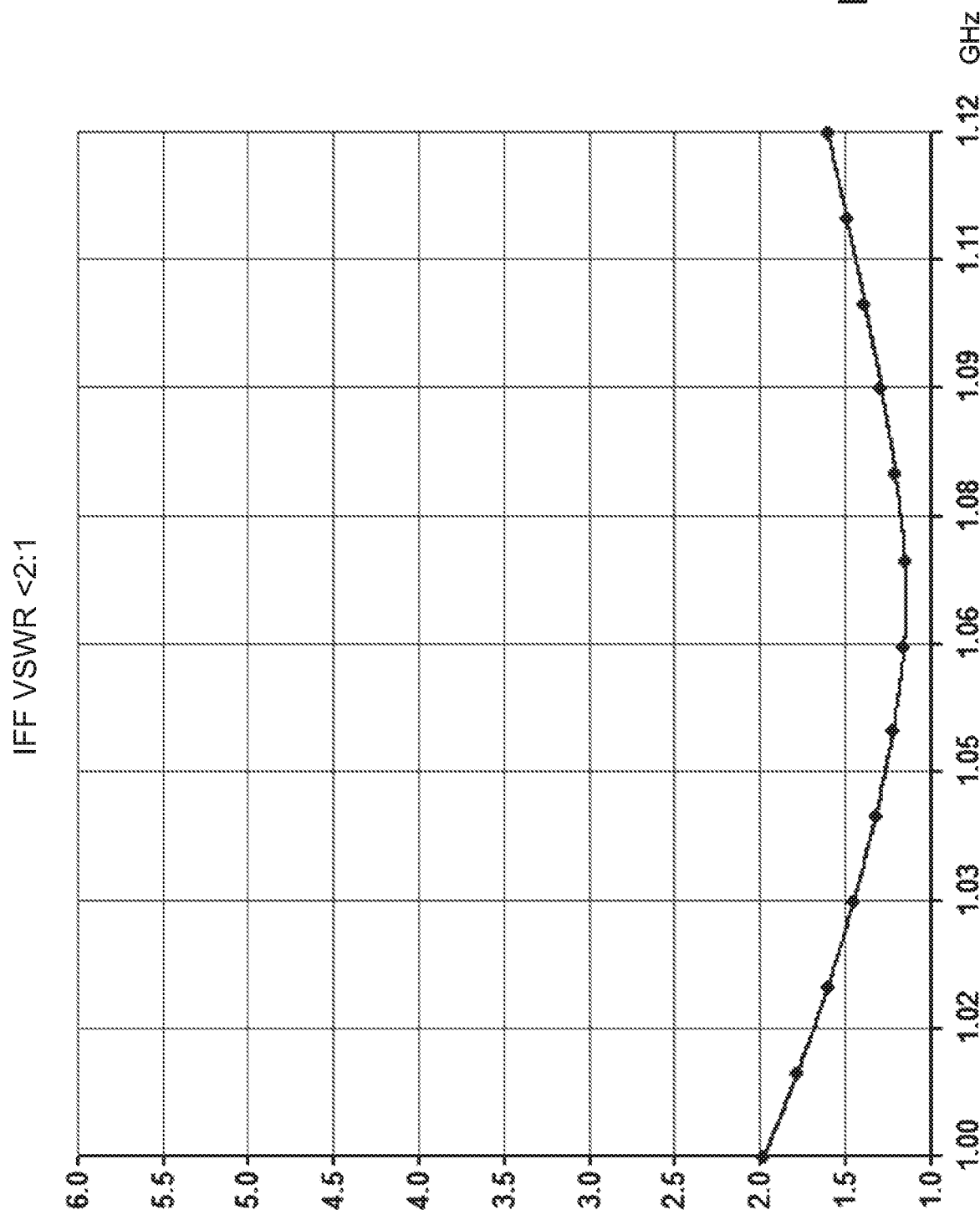

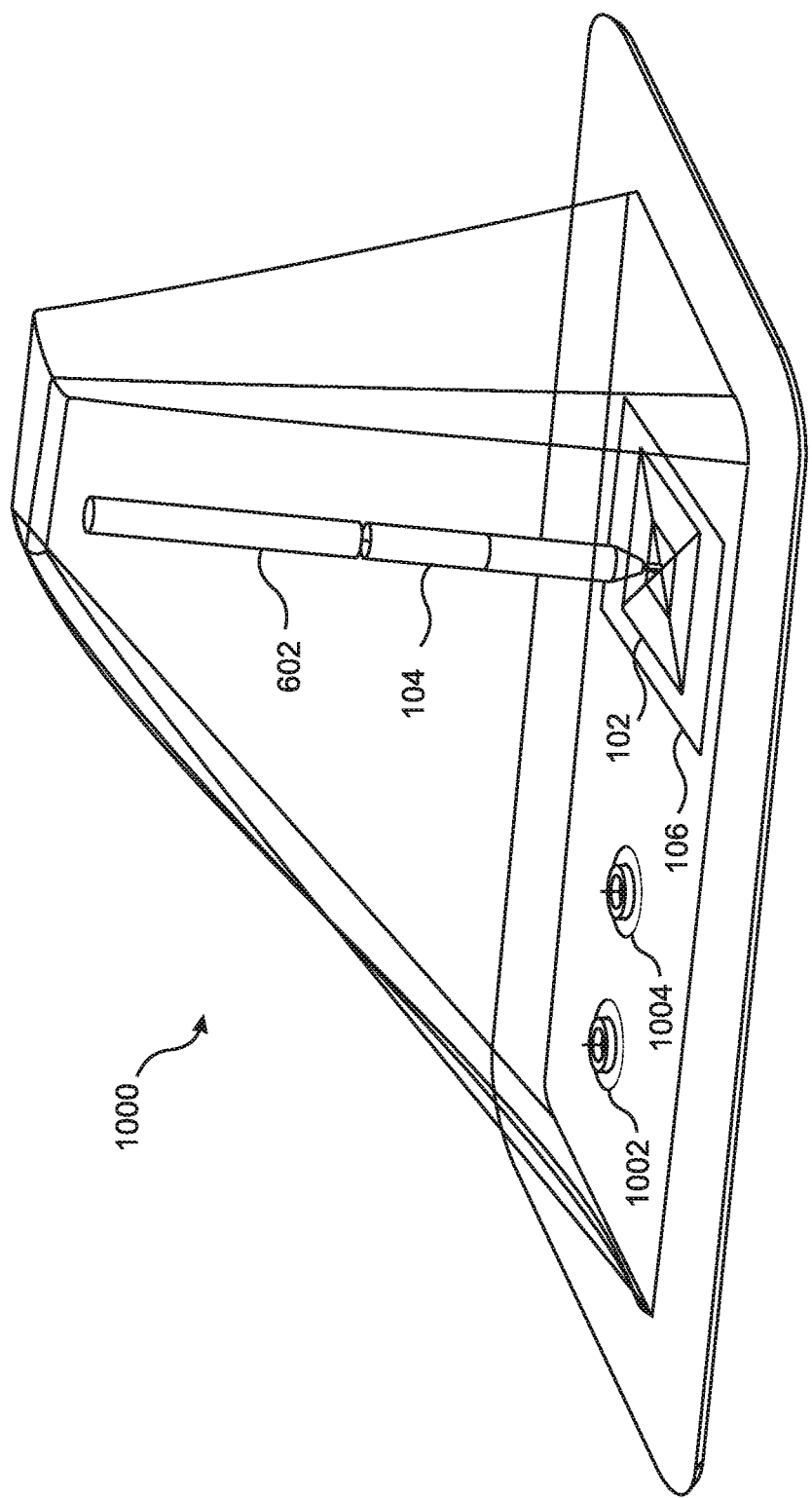

DUAL-BAND GPS/IFF ANTENNA

FIELD

The disclosure relates to radio frequency antennas, and more particularly to multi-band radio frequency antennas.

BACKGROUND

The communication requirements that apply to both civilian and military aircraft, ships, land vehicles, and other mobile assets continue to evolve. Often, simultaneous or near-simultaneous communication is required on a plurality of frequency bands that are dedicated to different purposes. For example, a military aircraft may be required to communicate on the 1020 MHz to 1100 MHz band for IFF (identification friend and foe), while also being able to receive signals on the 1565 MHz to 1585 MHz band for global positioning system (GPS) ADS-B (Automatic Dependent Surveillance-Broadcast) air traffic control and monitoring. In some cases, ultra high frequency (UHF) communication may also be desired in the 255-400 MHz band.

Efficient and reliable wireless communication is strongly dependent on optimal design of the antenna that is used to broadcast and receive signals. In particular, an antenna that has been optimized for use at a specific frequency will generally provide much higher performance than a broadband antenna design. Unfortunately, however, there are no compact IFF/GPS band specific antennas available, and so-called wide, L band antennas (1-2 GHz) are simply compromise "mash ups" of two separate antennas that are significantly reduced in performance.

Of course, one possible solution is to deploy a separate antenna for each desired frequency band. However, for some applications this approach can have undesirable effects, such as increased drag and/or radar signature for an aircraft. Also, due to changing requirements, it is often desirable to add additional frequency bands to an existing asset without adding additional antennas. For example, it may be desirable to add a GPS receiver, and possibly also UHF capability to an existing IFF-capable aircraft, without the expense and other disadvantages of increasing the number of installed antennas.

In addition, existing approaches for providing multi-band communication often struggle with interference between the communication bands. For example, an IFF transmission that is detected by a GPS antenna can potentially jam the GPS reception and/or saturate components in the GPS receiver.

What is needed, therefore, is an improved antenna assembly and wireless communication system whereby the antenna assembly provides high performance for both IFF and GPS communication, while minimizing interference between IFF transmissions and GPS reception, preferably where the antenna assembly can replace an existing IFF antenna.

SUMMARY

An improved antenna assembly and wireless communication system are disclosed, whereby the antenna assembly provides high performance for both IFF and GPS communication, while minimizing interference between IFF transmissions and GPS reception. In embodiments, the antenna assembly has a compact footprint that allows the disclosed assembly to replace an existing IFF antenna on an aircraft or other IFF-capable asset.

The disclosed antenna assembly combines a GPS "patch" antenna element with an orthogonal IFF element. The GPS patch has a substantially flat profile, and in embodiments it is installed parallel to the base of the antenna assembly. In some embodiments, the IFF element is a monopole element, configured as an elongated tube or rod that extends upward from the center of the GPS patch. In embodiments, the IFF monopole and GPS patch assembly is configured as a blade antenna that can replace an existing IFF blade antenna. In other embodiments, the IFF element is an annular slot IFF transponder antenna that is centered on the GPS patch. Some of these embodiments are fully conformal to the outer surface upon which the antenna assembly is mounted.

IFF performance is provided by embodiments of the disclosed antenna assembly and system in the 1020 MHz to 1100 MHz band, while GPS performance is provided in the 1565 MHz to 1585 MHz band. In some embodiments, the GPS patch can receive signals in both the L2 (1216 MHz through 1240 MHz) band and the L1 (1565 MHz through 1585 MHz) frequency band. In embodiments, the disclosed antenna assembly further provides high performance for UHF communication in the 225 MHz to 400 MHz band.

The physically orthogonal arrangement of the IFF and GPS antenna elements provides a natural isolation between them, so that the tendency for IFF transmissions to electronically "load" and/or interfere with GPS reception is reduced. Isolation filters and/or GPS receiver blanking are also included in embodiments of the disclosed antenna and/or communication system to further prevent power transmitted by the IFF transponder antenna from jamming the GPS reception.

Jamming of the GPS reception by IFF transmissions can arise from at least two mechanisms. First, a small amount of energy from IFF transmissions will fall into the GPS frequency range, and could potentially overpower the GPS signal. In addition, energy at the IFF frequency that enters the GPS channel has the potential to saturate one or more in-line low noise amplifiers (LNA's) of the GPS receiver, which could persist and interfere with GPS reception even after IFF transmission has ceased.

In embodiments, the power transmitted by the IFF antenna element is attenuated by at least 60 dB, and in embodiments by 70 dB or more, at the GPS frequency as received by the GPS antenna. When the disclosed antenna elements are combined with IFF and GPS bandpass filters, energy transmitted at +58 dBm at the IFF frequency and detected by the GPS element is reduced in embodiments to less than −15 dBm, and in some embodiments to less than −25 dBm at the IFF frequency, while the energy at the GPS frequency is reduced to less than −110 dBm. Some embodiments provide separate RF connectors for the IFF and GPS functions of the antenna assembly, while other embodiments include an internal diplexer and only a single RF connector.

In embodiments, the antenna assembly further includes a UHF monopole element that is co-linear with (but does not overlap) the IFF monopole element. Embodiments include two RF connectors, whereby at least one internal diplexer is used to share one of the connectors between two of the antenna elements. Embodiments further include blanking of the GPS receiver during IFF transmissions.

A first general aspect of the present disclosure is an antenna assembly for wireless communication at two radio frequencies F1 and F2. The assembly includes a horizontal patch antenna element configured for communication over a second frequency range that includes F2 but not F1, the horizontal patch antenna having circular polarization and an omni-azimuth gain pattern that is maximal substantially at its horizon, and a first vertical antenna element extending upward from a center of the horizontal patch antenna element and configured for communication over a first frequency range that include F1 but not F2, the first vertical antenna element having vertical polarization and an omni-azimuth gain pattern that is maximal substantially at its zenith.

In embodiments, F1 is between 1000 MHz and 1200 MHz, and F2 is between 1200 MHz and 1600 MHz.

In any of the preceding embodiments, the first vertical antenna element can be a vertical monopole antenna element. In some of these embodiments, the antenna assembly is configured as a blade for installation on a vehicle as a replacement for an existing blade antenna that is optimized for wireless communication within a frequency range that does not include both F1 and F2.

Any of these embodiments can further include a second vertical monopole antenna element co-linear with the first vertical monopole element and configured for optimal communication at a frequency F3 that is lower than F1 and F2, the second vertical monopole antenna element having vertical polarization and an omni-azimuth gain pattern that is maximal substantially at its zenith. In some of these embodiments the first vertical monopole antenna element is between the horizontal patch antenna element and the second monopole antenna element. In any of these embodiments, the second vertical monopole antenna element can be between the horizontal patch antenna element and the first monopole antenna element. In any of these embodiments, F3 can be between 200 MHz and 400 MHz. Any of these embodiments can further include a diplexer that provides access to the horizontal patch antenna element and the first vertical monopole antenna element via a first connector, and to the second vertical monopole antenna via a second connector.

Any of the preceding embodiments can further include a first connector cooperative with the horizontal patch antenna element and a second connector cooperative with the first vertical antenna element.

Any of the preceding embodiments can further include an RF amplifier integral with the antenna assembly and cooperative with the horizontal patch antenna.

Any of the preceding embodiments can further include a diplexer integral with the antenna assembly and cooperative with both the horizontal patch antenna element and the first vertical antenna element, and a connector that is cooperative with the diplexer.

In any of the preceding embodiments, the first vertical antenna element can be an annular slot transponder antenna element that is centered on the GPS patch antenna element. In some of these embodiments, the antenna assembly is fully conformal to a surface upon which the antenna assembly is mounted.

A second general aspect of the present disclosure is a wireless communication system configured for communication at two radio frequencies F1 and F2. The system includes an antenna assembly according to claim 1, a receiver having a receiver input in communication with the horizontal patch antenna element and configured for receiving signals at frequency F1, and a first transceiver in communication with the first vertical antenna element and configured for transmitting and receiving signals at frequency F2.

In embodiments, the system further includes a first bandpass filter interposed between the horizontal patch antenna element and the receiver input, the first bandpass filter being tuned to pass only frequencies in a first filter range that includes F1 but not F2, and a second bandpass filter interposed between the first vertical antenna element and the first transceiver, the second bandpass filter being tuned to pass only frequencies in a second filter range that includes F2 but not F1.

In any of the preceding embodiments, the system can further include a blanking apparatus that is able to block the receiver input while the first transceiver is transmitting energy at frequency F1.

In any of the preceding embodiments, the receiver can be configured to receive GPS signals, and the first transceiver is configured to send and receive IFF signals.

In any of the preceding embodiments, the system can further include a second vertical monopole antenna element co-linear with the first vertical monopole element and configured for optimal communication at a frequency F3 that is lower than F1 and F2, the second vertical monopole antenna element having vertical polarization and an omni-azimuth gain pattern that is maximal substantially at its zenith, and a second transceiver in communication with the second vertical antenna element and configured for transmitting and receiving signals at frequency F3. And in some of these embodiments the second transceiver is configured to send and receive UHF signals.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2A is a graph showing a typical elevation plane radiation pattern for the vertical monopole antenna element of FIGS. 1A and 1B, wherein the azimuth plane radiation pattern is omni-directional;

FIG. 2B is a graph showing typical VSWR values for the vertical monopole IFF band antenna element of FIGS. 1A and 1B;

FIG. 10 is a perspective view of an embodiment that includes the antenna assembly of FIG. 6 incorporated into a blade configuration;

DETAILED DESCRIPTION

The present disclosure is an improved antenna assembly and wireless communication system, wherein the antenna assembly provides high performance for both IFF and GPS communication, while minimizing interference between IFF transmissions and GPS reception. In embodiments, the antenna assembly has a compact footprint that allows the disclosed assembly to replace an existing IFF antenna on an aircraft or other IFF-capable asset.

Figure 1A:
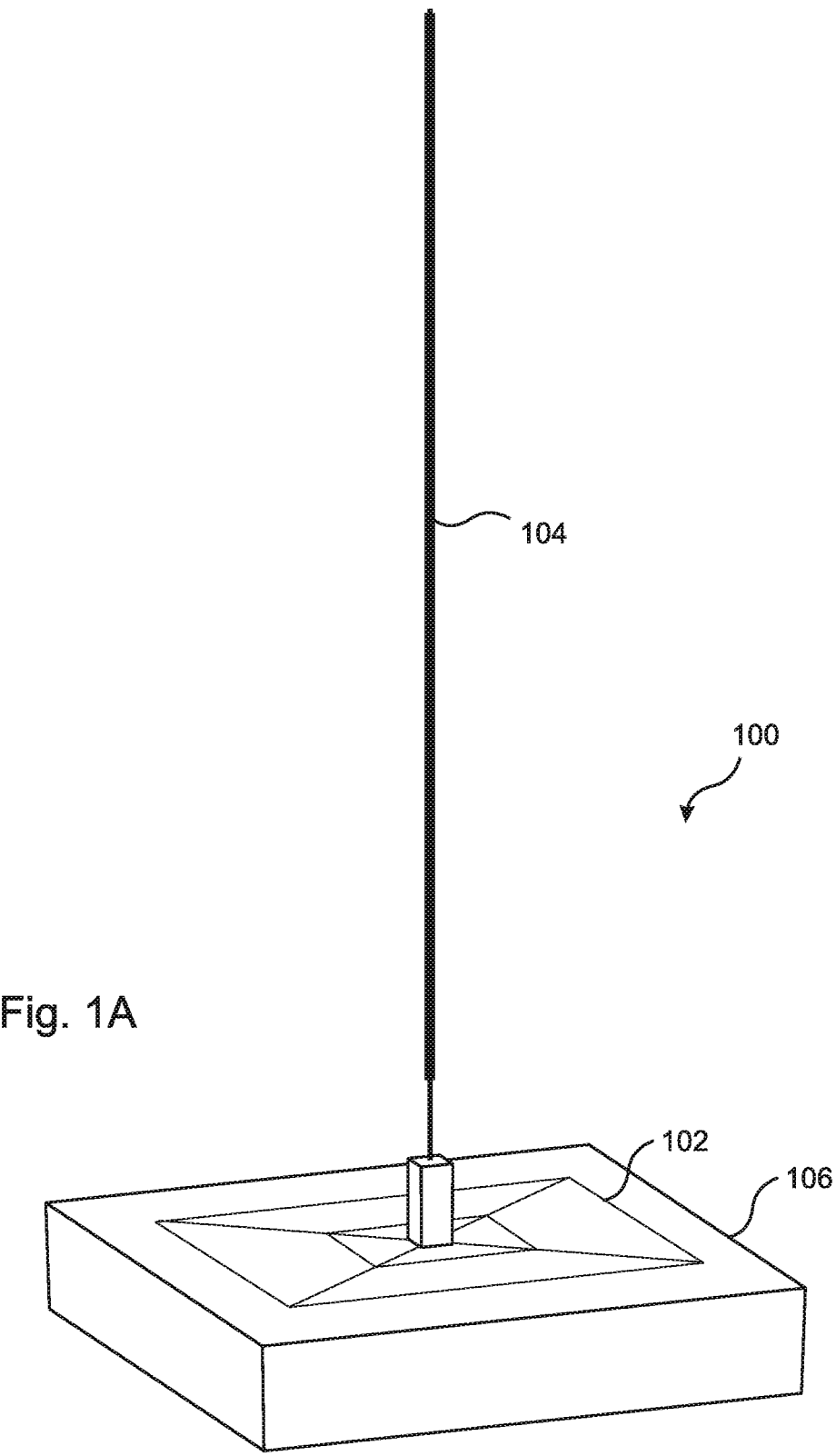
FIG. 1A is a perspective view from the side of an embodiment that includes a vertical monopole IFF band antenna element.
Figure 1B:
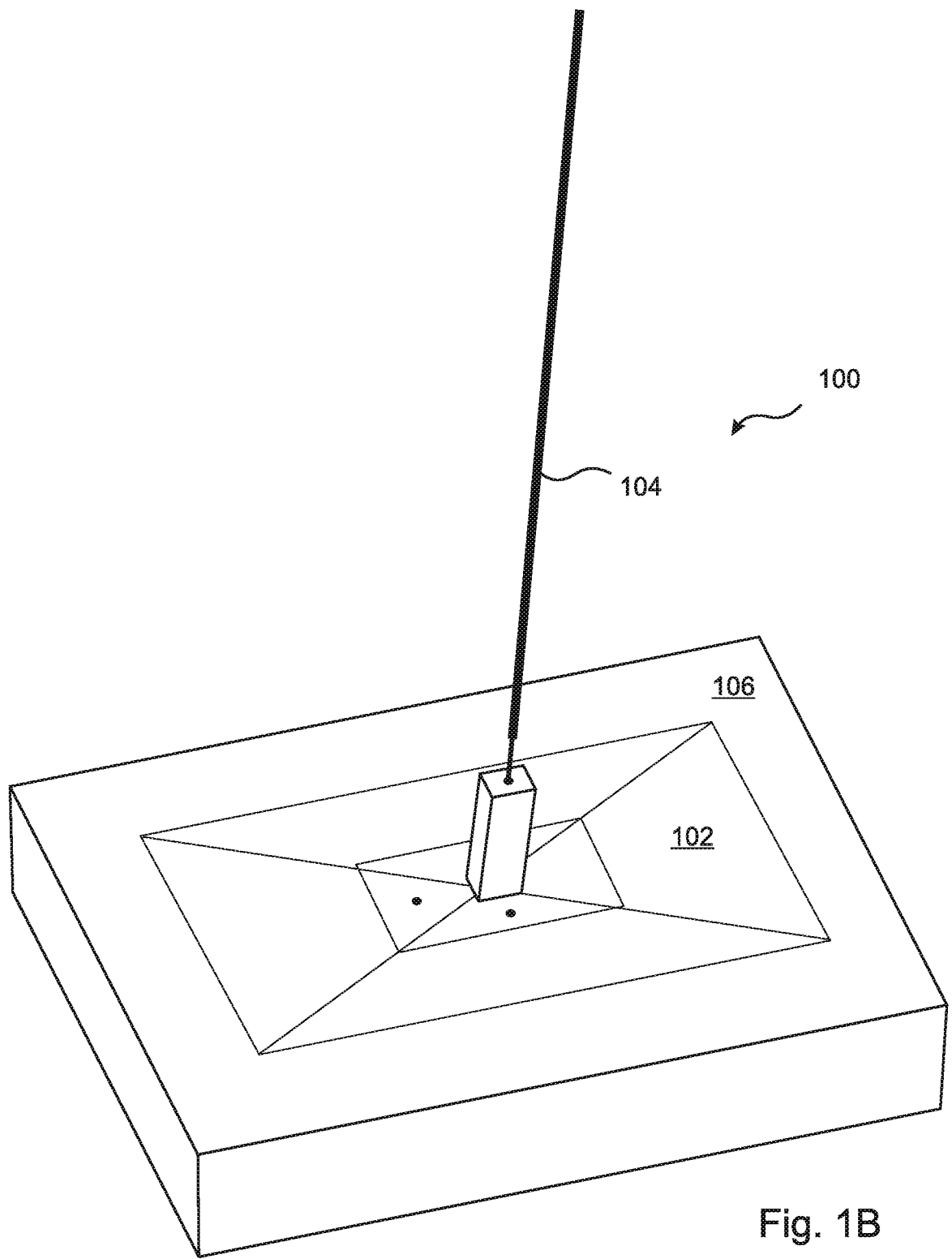
FIG. 1B is a perspective view from above of the embodiment of FIG. 1A.

With reference to FIGS. 1A and 1B, the disclosed antenna assembly 100 combines a GPS "patch" antenna element 102 with an orthogonal IFF element 104. The GPS patch 102 has a substantially flat profile, and in the embodiment of FIGS. 1A and 1B it is installed parallel to the base 106 of the antenna assembly 100. In the embodiment of FIGS. 1A and 1B, the IFF element 104 is a monopole element, configured as an elongated tube or rod that extends upward from the center of the GPS patch 102. In the illustrated embodiment, the IFF monopole 104 is connected to an IFF connector (not shown) on the rear surface of the antenna base 106 via a hole that is fabricated through the dielectric base material 106 passing through the center of the GPS patch antenna element 102. The outer conductor of a coax cable from the IFF connector is soldered to the GPS patch element 102, and the coax cable center conductor is soldered to the IFF monopole 104. The GPS patch element 102 is tuned such that this feature does not interfere with its performance.

IFF performance is provided by the embodiment of FIGS. 1A and 1B is in the 1020 MHz to 1040 MHz and 1080 MHz to 1100 MHz bands. In the illustrated embodiment, the IFF monopole 104 is approximately 2.85 inches high, and the patch antenna 102 is square with a length of 1.135 inches and a height of 0.15 inches. The voltage standing wave ratio (VSWR) is less than 1.5:1 for each of the IFF bands, the polarization is vertical, the gain is 3.5 dBi peak with an omni-azimuth pattern that has maximum gain substantially at the horizon.

FIGS. 2A and 2B are graphs that illustrate the IFF elevation plane radiation pattern and voltage standing wave ratio (VSWR), respectively, for the embodiment of FIGS. 1A and 1B. For these graphs, the gain calculations assume a 1.5 dB transmission loss, and a 3.5 dBi IFF transponder.

The GPS performance provided by the embodiment of FIGS. 1A and 1B is in the 1565 MHz to 1585 MHz band (L1 only). The VSWR is less than 1.5:1, the polarization is right hand circular (RHCP), and the gain is 3.5 dBic with an ommi-azimuth pattern that has maximum gain at the zenith.

Figure 3A:
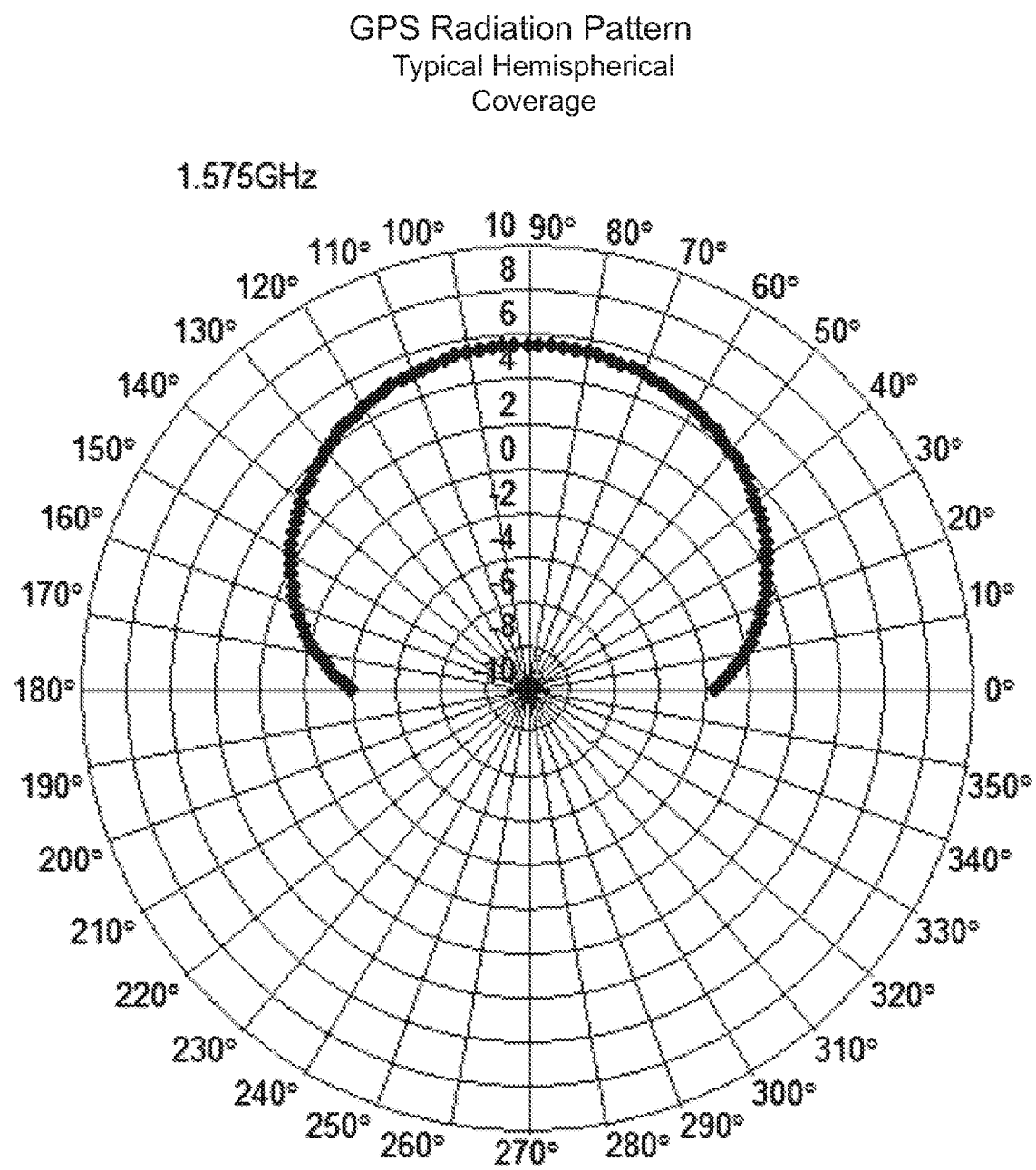
FIG. 3A is a graph showing a typical elevation plane radiation pattern for the horizontal patch antenna GPS L1 band element of FIGS. 1A and 1B, wherein the azimuth plane radiation pattern is omni-directional.
Figure 3B:
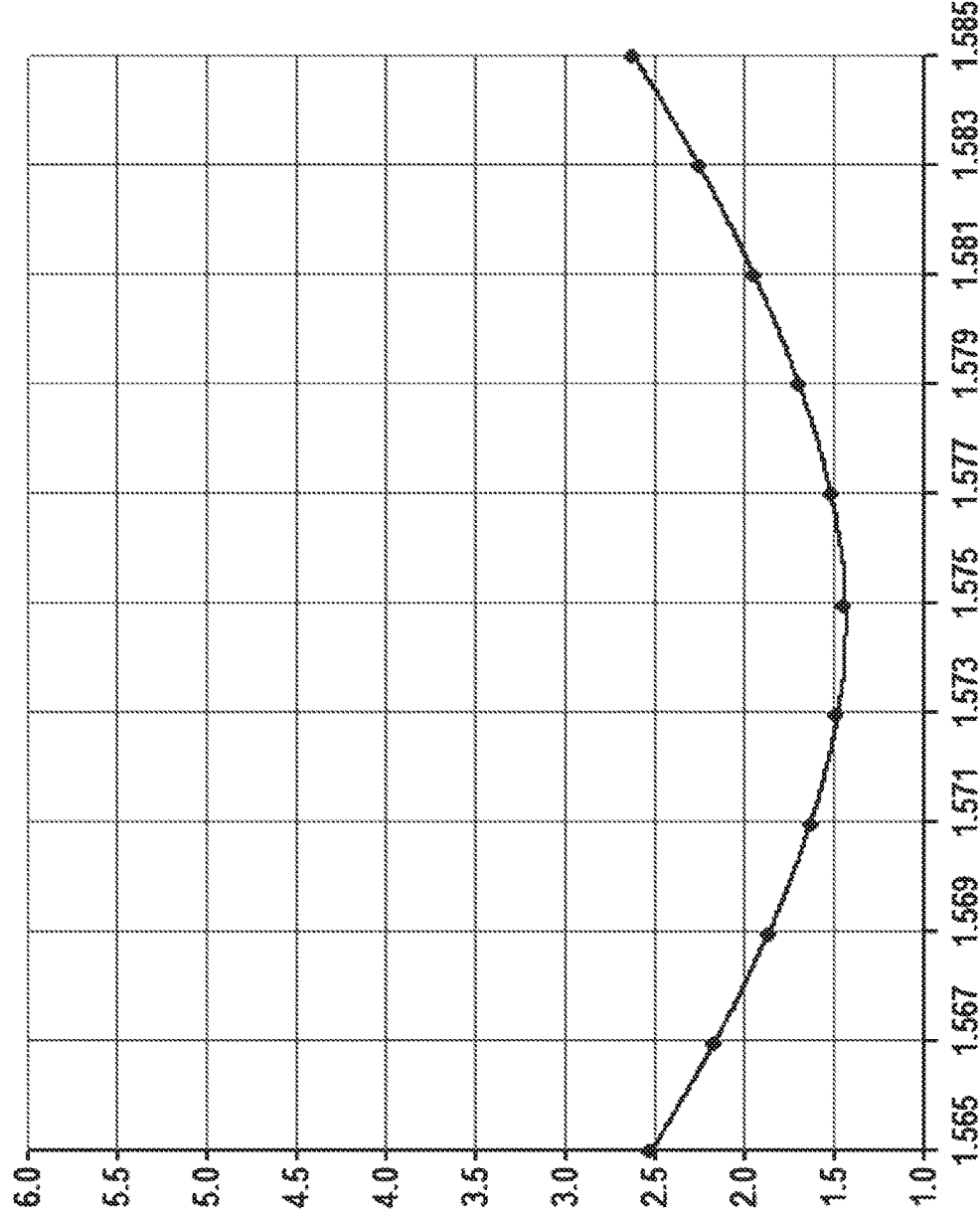
FIG. 3B is a graph showing typical VSWR values for the horizontal patch antenna element of FIGS. 1A and 1B.

FIGS. 3A and 3B are graphs that illustrate the GPS elevation plane radiation pattern and VSWR, respectively, for the embodiment of FIGS. 1A and 1B, where. For these graphs, the gain calculations assume a 1.5 dB transmission loss, and a 3.5 dBic GPS receiver.

The physically orthogonal arrangement of the IFF 104 and GPS 102 antenna elements provides a natural isolation between them, so that the tendency for the IFF antenna to electronically "load" the GPS channel is reduced. Jamming of the GPS reception by IFF transmissions can arise from at least two mechanisms. First, the IFF frequency bandwidth does not have an infinitely sharp cutoff, such that a small amount of energy from IFF transmissions will fall into the GPS frequency range, and could potentially overpower the GPS signal. In addition, energy at the IFF frequency that enters the GPS channel has the potential to saturate one or more in-line low noise amplifiers (LNA's) of the GPS receiver, which could persist and interfere with GPS reception even after IFF transmission has ceased.

In embodiments, the power transmitted by the IFF antenna element is attenuated by at least 50 dB, and in embodiments by 70 dB or more, at the GPS frequency as received by the GPS antenna. When the disclosed antenna elements are combined with IFF and GPS bandpass filters, energy transmitted at +58 dBm at the IFF frequency and detected by the GPS element is reduced in embodiments to less than −15 dBM, while the energy at the GPS frequency is reduced to less than −100 dBm. Calculated IFF/GPS parameters for the embodiment of FIGS. 1A and 1B are presented in Table 1 below.

TABLE 1

IFF/GPS coupling for the embodiment of FIGS. 1A and 1B

|  | IFF (1090 MHz) | GPS (1575 MHz) |
|---|---|---|
| Input power to Transponder Port | +58 dBm | +58 dBm |
| Transponder Spectral Loss | 0 dB | 70 dB |
| Transponder Transmission loss | 1.0 dB | 5 dB |
| GPS Antenna Transmission Loss | 10 dB | 1 dB |
| Coupling Loss | 10 dB | 10 dB |
| GPS Mode Former Loss | 25 dB | 35 dB |
| GPS Antenna Output - | 12 dBm | −63 dBm |
| GPS Band-Pass Filter | 30 dB | 0 dB |
| Transponder Band-Pass Filter | 0 dB | 35 dB |
| Input to GPS Receiver - | −18 dBm | −98 dBm |

Figure 4:
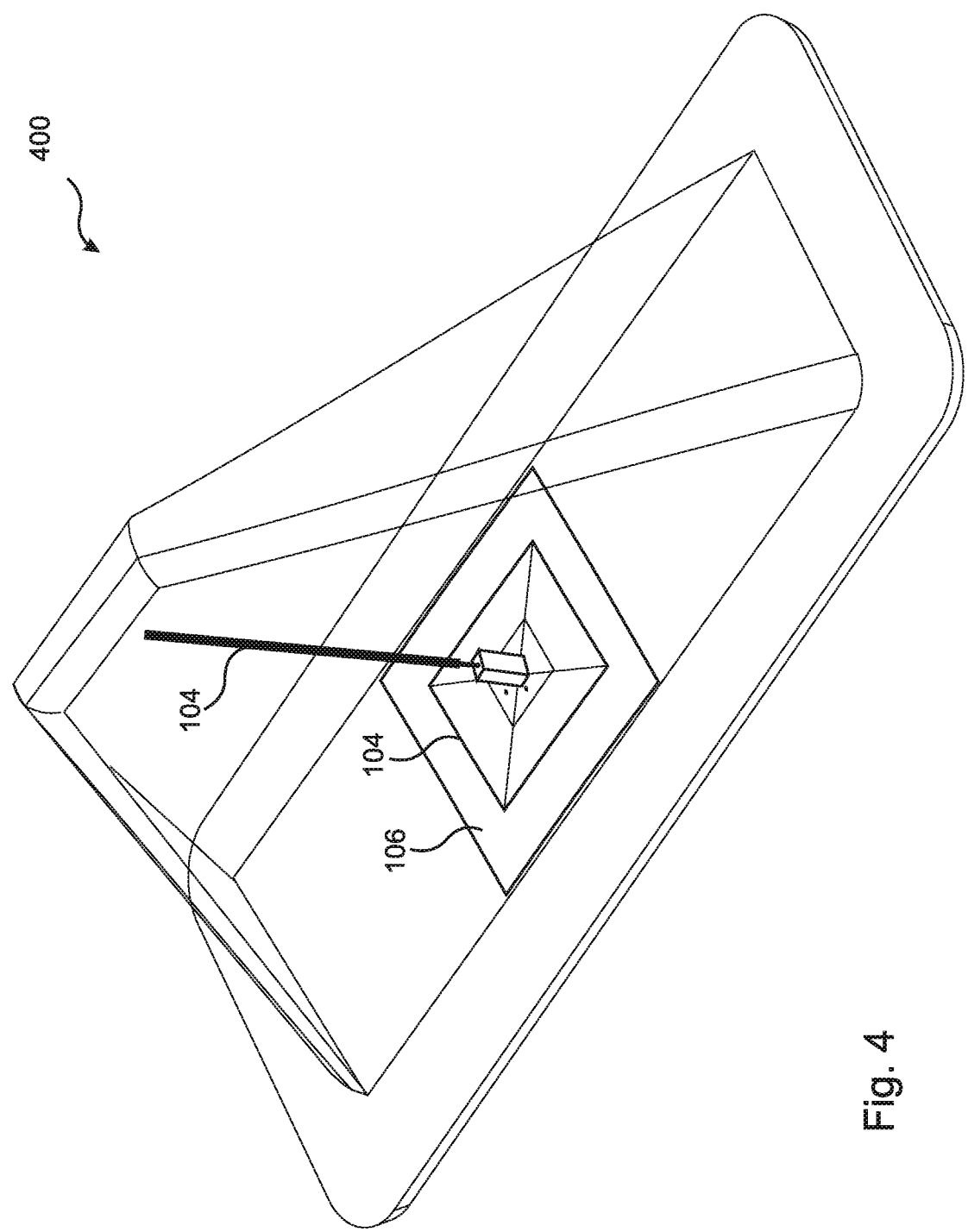
FIG. 4 is a perspective view of an embodiment that includes the antenna assembly of FIGS. 1A and 1B incorporated into a blade configuration.

With reference to FIG. 4, the assembly 100 of FIGS. 2A and 2B can be configured as a blade antenna 400 that can replace an existing IFF blade antenna. In the embodiment of FIG. 4, the blade is 2.375 inches wide, 6 inches long, and 3 inches tall.

Figure 5A:
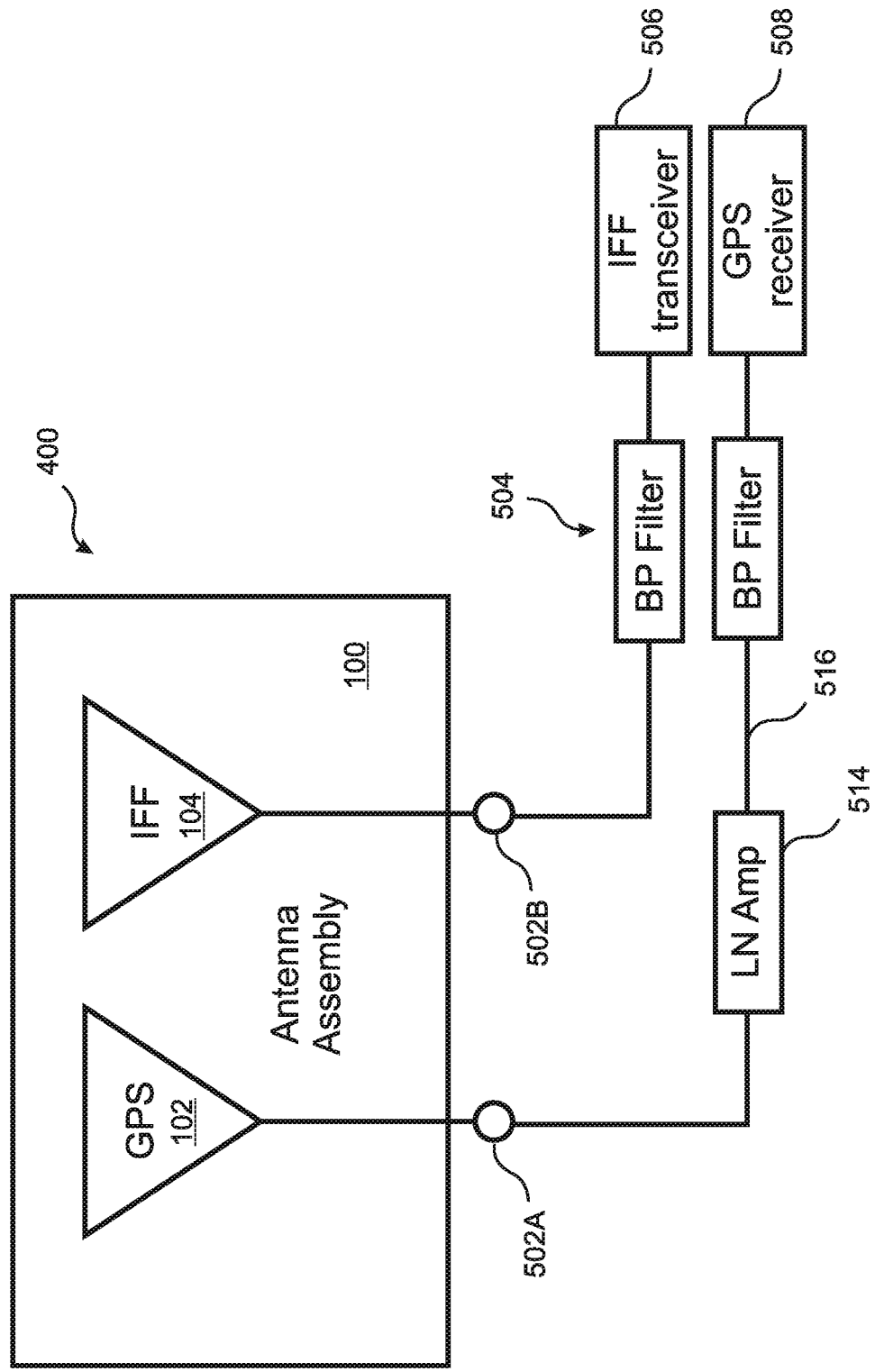
FIG. 5A is a block diagram illustrating a wireless communication system that includes an antenna assembly of the present disclosure configured with separate IFF and GPS connectors, combined with a low noise GPS amplifier and bandpass filters for both GPS and IFF frequencies.

With reference to FIG. 5A, some embodiments provide separate RF connectors 502A, 502B for the IFF and GPS functions of the antenna assembly 100. Some of these embodiments further comprise an integrated GPS low noise amplifier 514, either at the antenna 100 or further along the RF cable 516 before the band-pass filter 514. In some embodiments, DC power for the low-noise amplifier 514 is supplied by the GPS receiver 508 via the RF coax cable 516. It can be see that in the embodiment of Table 1 the IFF level at the LNA 514 would exceed −10 dBm. This would saturate the LNA amplifier 514, resulting in reduced L1 signal level at the GPS receiver. Therefore, it would be necessary to include an IFF blanking switch 512 (FIG. 5B) before the LNA 514 (FIG. 5A) to avoid saturation of the LNA 514. The embodiment of FIG. 5A further includes bandpass filters 504 on both of the IFF and GPS channels that further improve the isolation of the IFF 506 and GPS 508 channels.

Figure 5B:
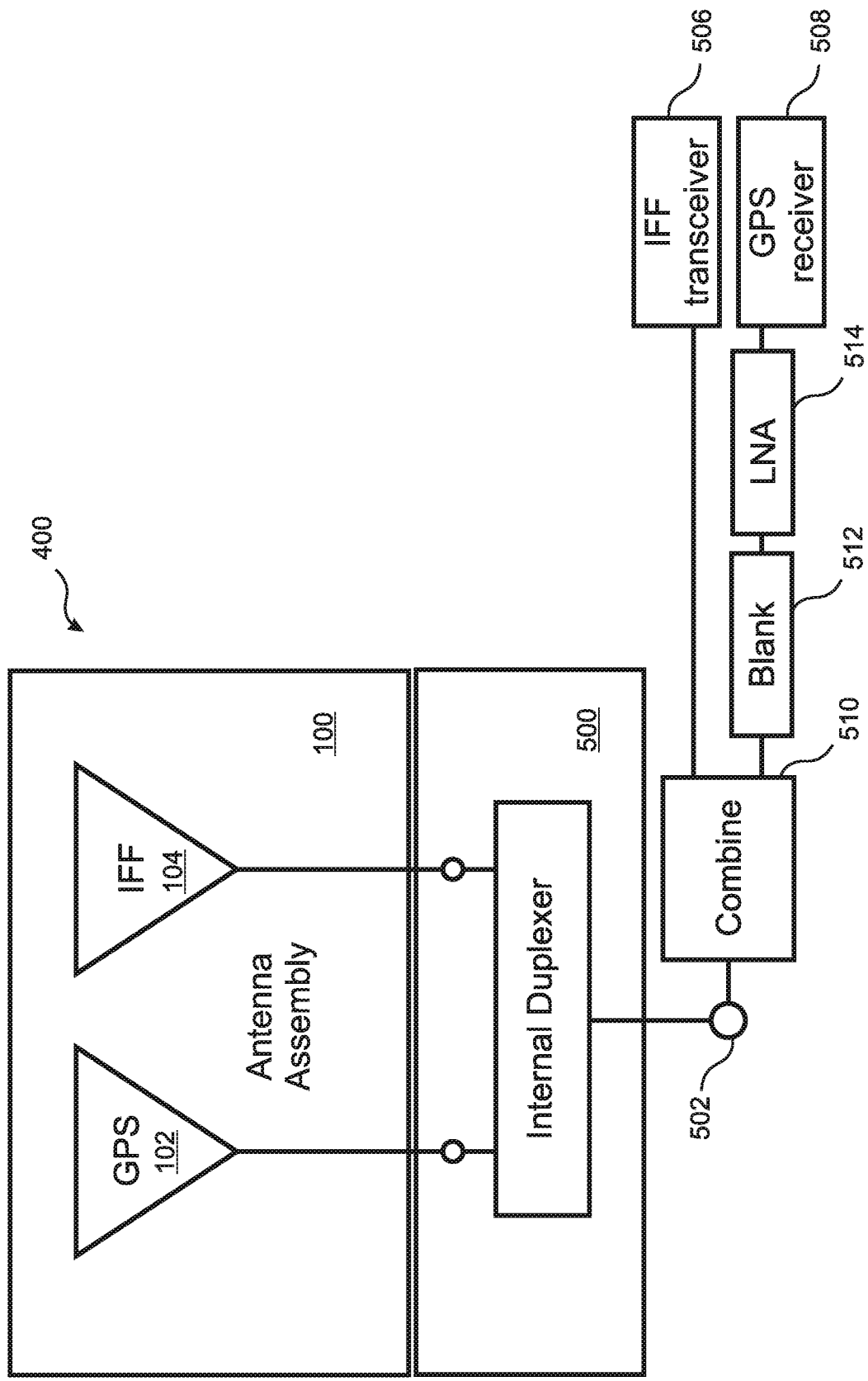
FIG. 5B is a block diagram illustrating a wireless communication system that includes an antenna assembly of the present disclosure configured with a single IFF and GPS connector shared by a diplexer and combiner, where the GPS receiver is protected from IFF transmissions by GPS blanking.

With reference to FIG. 5B, other embodiments include an internal diplexer 500 and only a single RF connector 502, whereby the outputs of the GPS receiver 508 and the IFF transceiver 506 are combined 510 so that they can both access the single connector 502. The embodiment of FIG. 5B further includes GPS blanking 512 that prevents IFF power applied to the shared connector 502 from coupling directly to the GPS receiver 508. In the embodiment of FIG. 5B, the inclusion of GPS blanking 512 eliminates any need for isolation filters 504 to protect the LNA 514 and GPS receiver 508. Certain single-connector embodiments further include an integrated GPS low noise amplifier 514 at the input to the GPS aperture.

Figure 6:
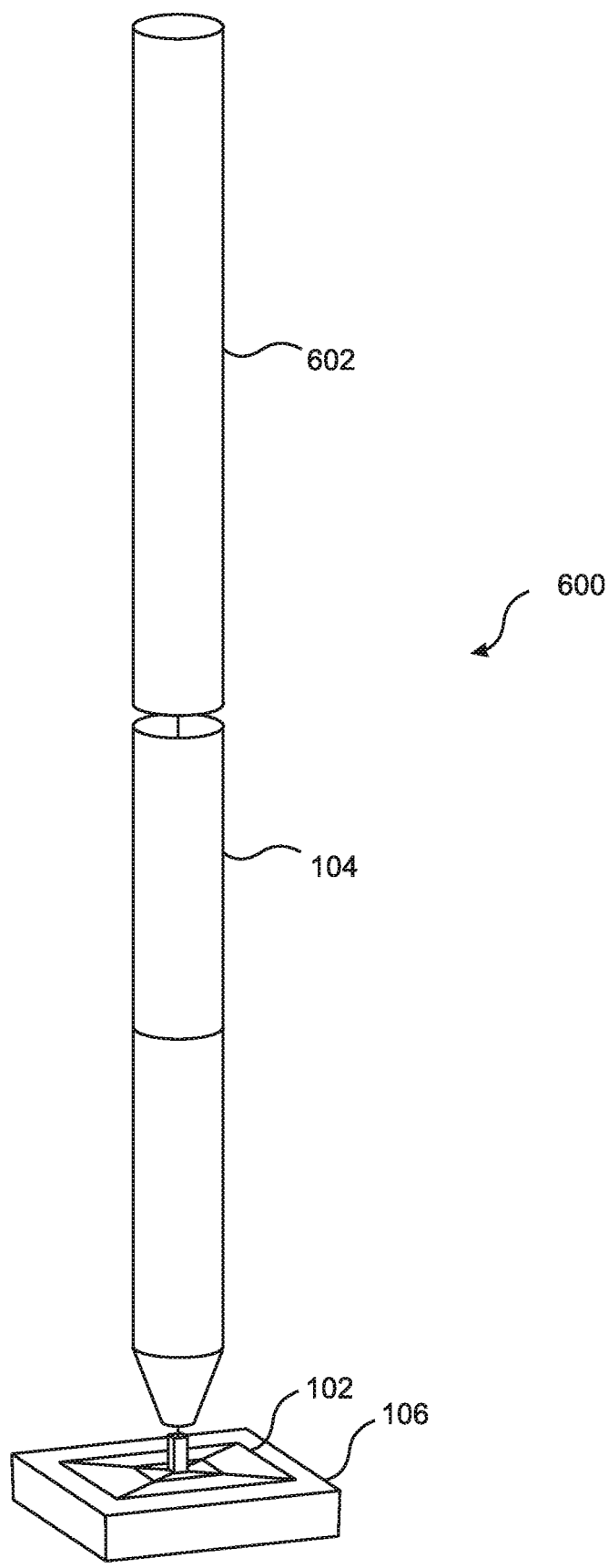
FIG. 6 is a perspective view of an embodiment that is similar to FIG. 1A, but includes a vertical UHF monopole antenna element above and co-linear with the IFF vertical antenna element.

With reference to FIG. 6, in embodiments the antenna assembly 600 further includes a UHF monopole element 602 that is co-linear with (but does not overlap) the IFF monopole element 104.

Embodiments include two RF connectors, whereby at least one internal diplexer is used to share one of the connectors between two of the antenna elements. Embodiments further include blanking of the GPS receiver during IFF transmissions.

With reference to FIG. 6, in embodiments the disclosed antenna assembly further provides high performance for UHF communication in the 225 MHz to 400 MHz band. In the illustrated embodiment, the antenna assembly 600 further includes a UHF monopole element 602 that is co-linear with (but does not overlap) the IFF monopole element 104. In this embodiment, the combined IFF 104 and UHF 602 elements are approximately nine inches tall.

The embodiment of FIG. 6 provides GPS communication in the frequency range (L1 only) of 1565 MHz through 1585 MHz with a VSWR of less than 1.5:1. The gain is 3.5 dBic peak, and the polarization is right hand circularly polarized (RHCP) with an omni-azimuth pattern having maximum gain at the zenith.

Figure 7A:
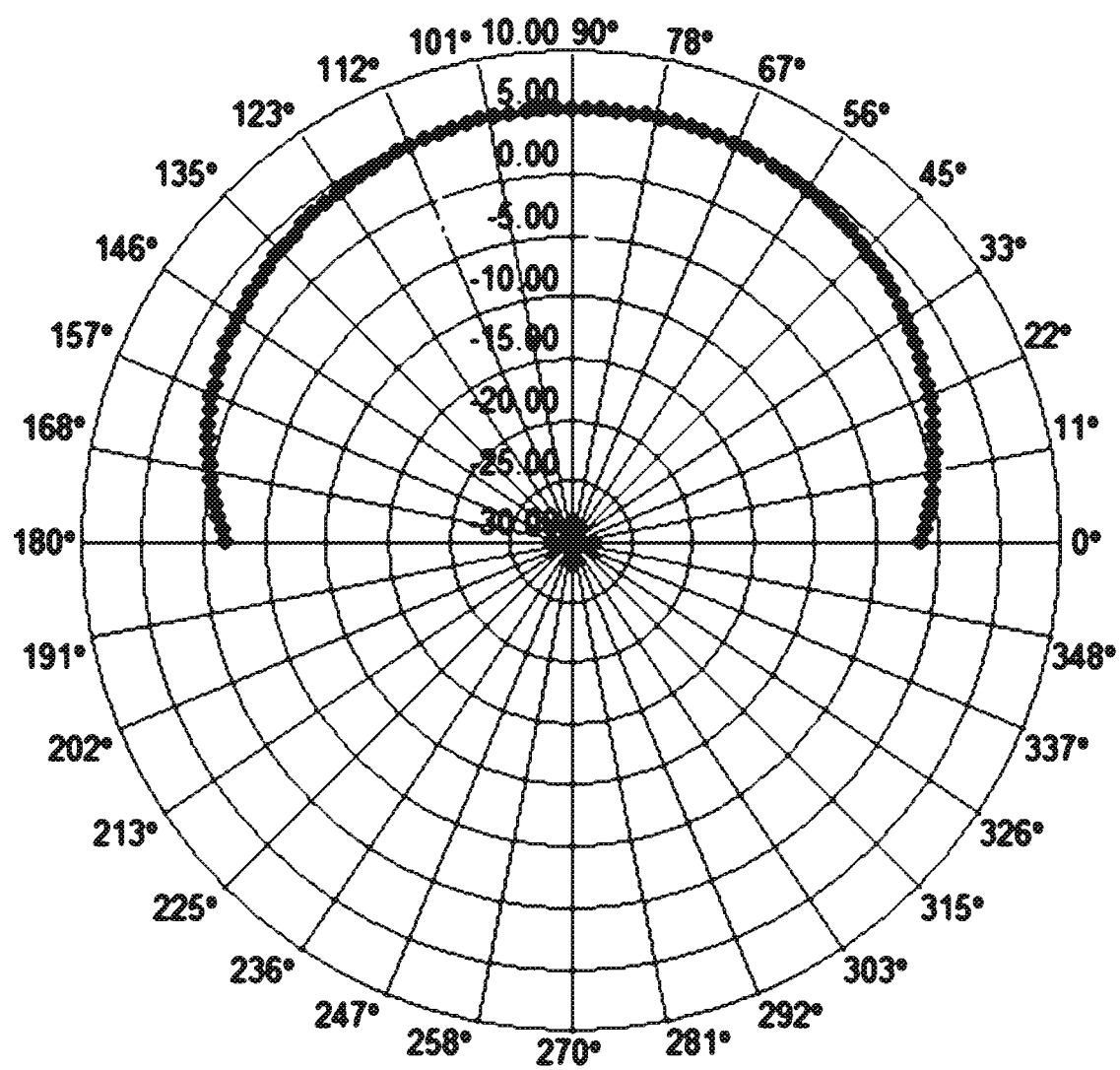
FIG. 7A is a graph showing a typical elevation plane radiation pattern for the horizontal GPS patch antenna element of FIG. 6.
Figure 7B:
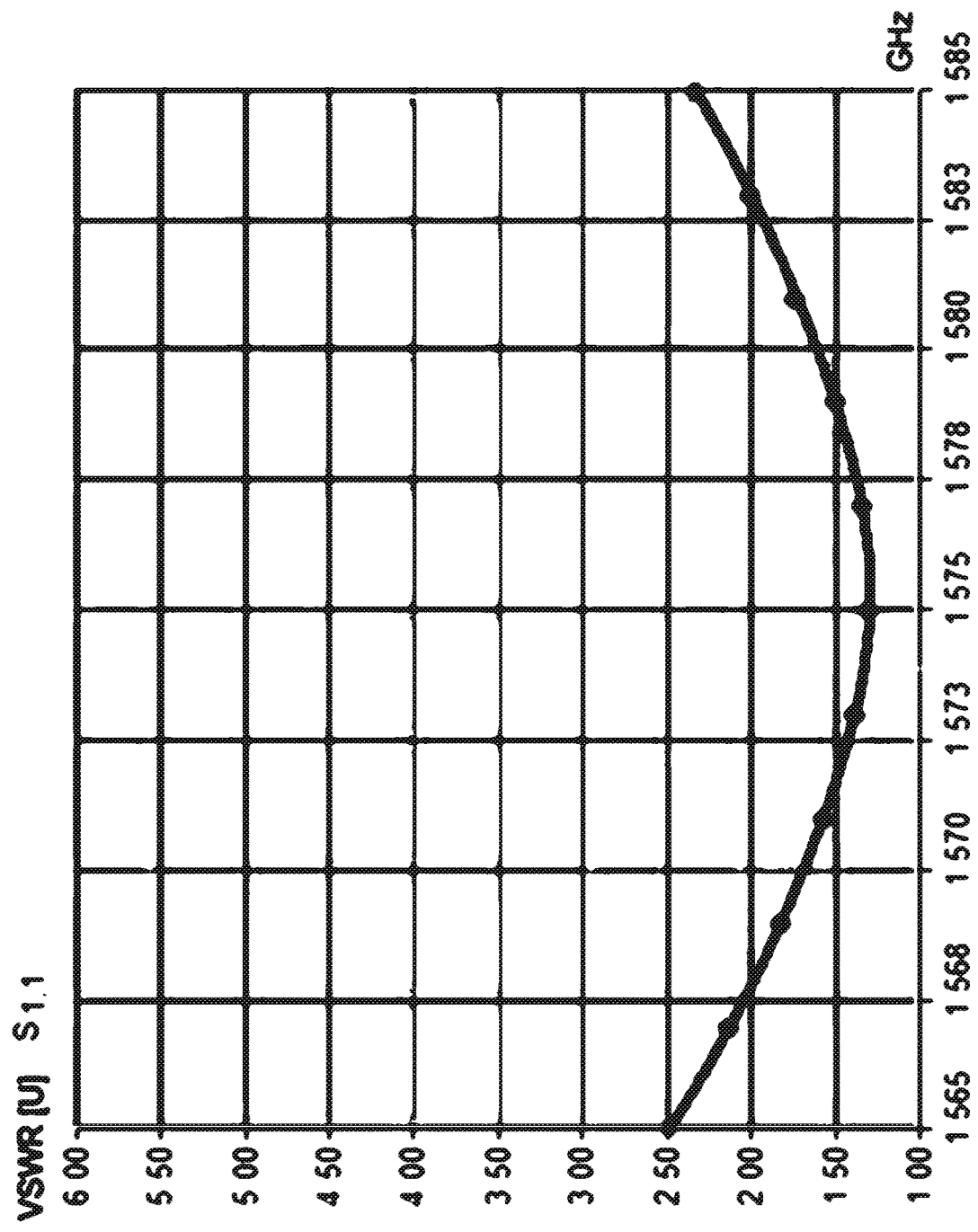
FIG. 7B is a graph showing typical VSWR values for the horizontal GPS patch antenna element of FIG. 6.

FIGS. 7A and 7B are graphs that illustrate the GPS elevation plane radiation pattern and VSWR, respectively, for the embodiment of FIG. 6. For these graphs, the calculations assume +3.5 dBic at the zenith, where the internal loss of the GPS antenna is assumed to be approximately 1.5 dB, a VSWR less than 2.5:1 at the feed points, and a VSWR less than 1.5:1 at the hybrid coupler input (internal diplexer output).

The embodiment of FIG. 6 provides UHF communication in the frequency range of 225 through 400 MHz with a VSWR of less than 2.5:1, and in embodiments less than 2.0:1. The gain is 2.0 dBi peak, and the polarization is vertical with an omni-azimuth pattern having maximum gain substantially at the horizon.

Figure 8A:
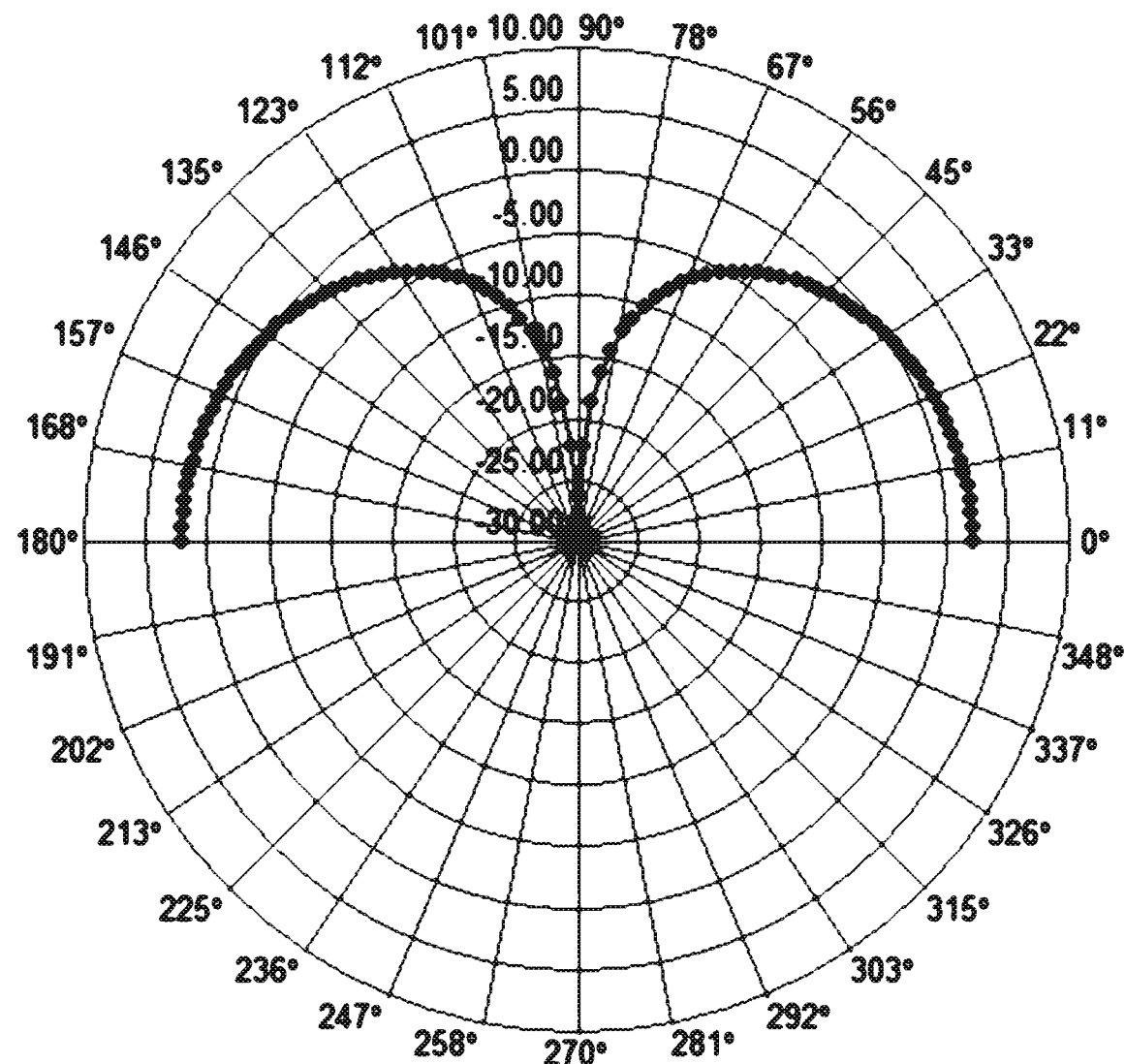
FIG. 8A is a graph showing a typical elevation plane radiation pattern for the vertical UHF monopole antenna element of FIG. 6.
Figure 8B:
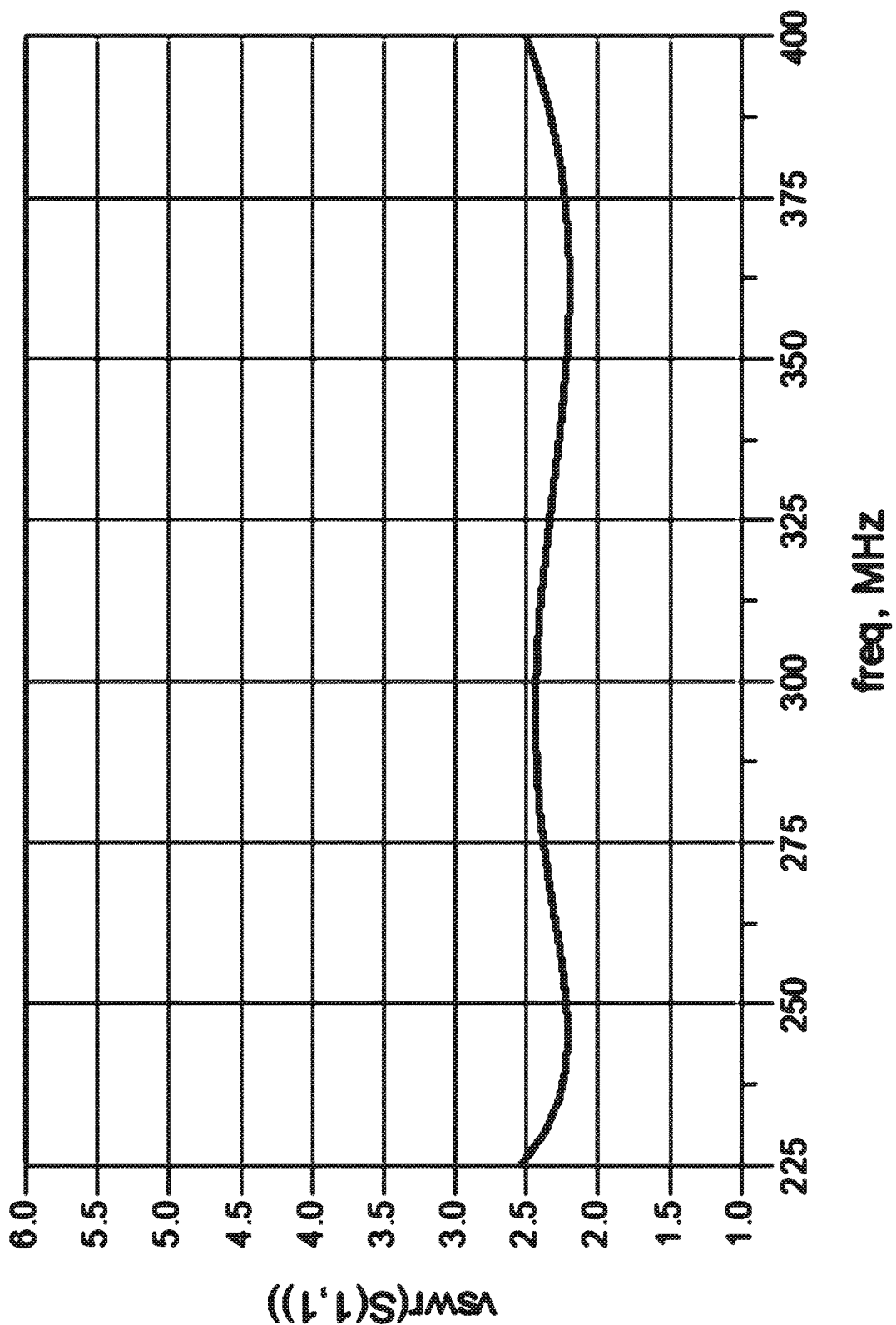
FIG. 8B is a graph showing typical VSWR values for the vertical UHF monopole antenna element of FIG. 6.

FIGS. 8A and 8B are graphs that illustrate the UHF radiation pattern and VSWR, respectively, for the embodiment of FIG. 6. For these graphs, the calculations assume +2.0 dB peak gain substantially at the horizon and a VSWR of less than 2.5:1.

The embodiment of FIG. 6 provides IFF communication in the frequency ranges of 1020 MHz through 1040 MHz (receive) and 1080 MHz through 1100 MHz (transmit) with a VSWR of less than 1.5:1 in each band. The gain is 2.0 dBi peak, and the polarization is vertical with an omni-azimuth pattern having maximum gain substantially at the horizon.

Figure 9A:
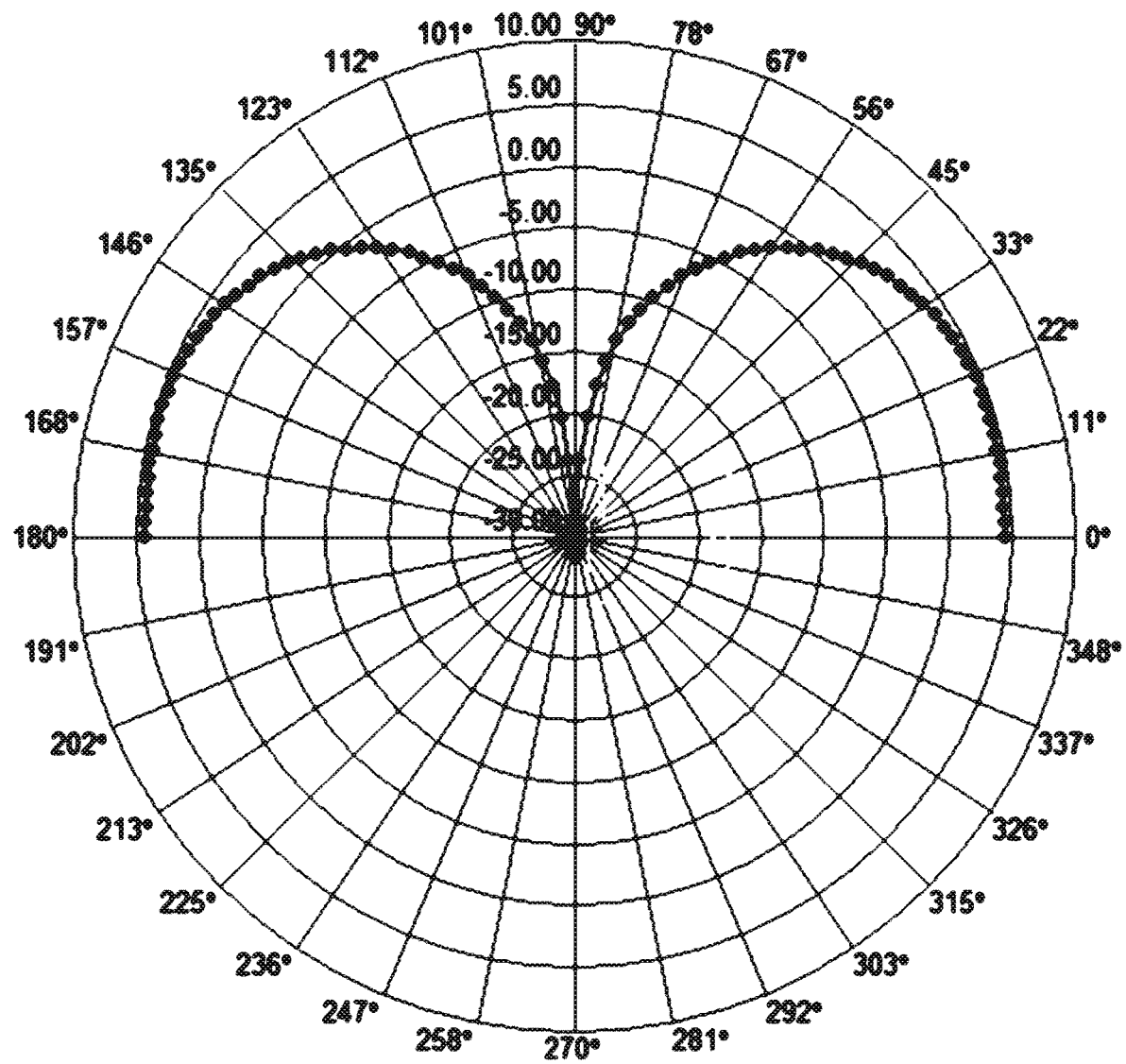
FIG. 9A is a graph showing a typical elevation plane radiation pattern for the vertical UHF band monopole antenna element of FIG. 6.
Figure 9B:
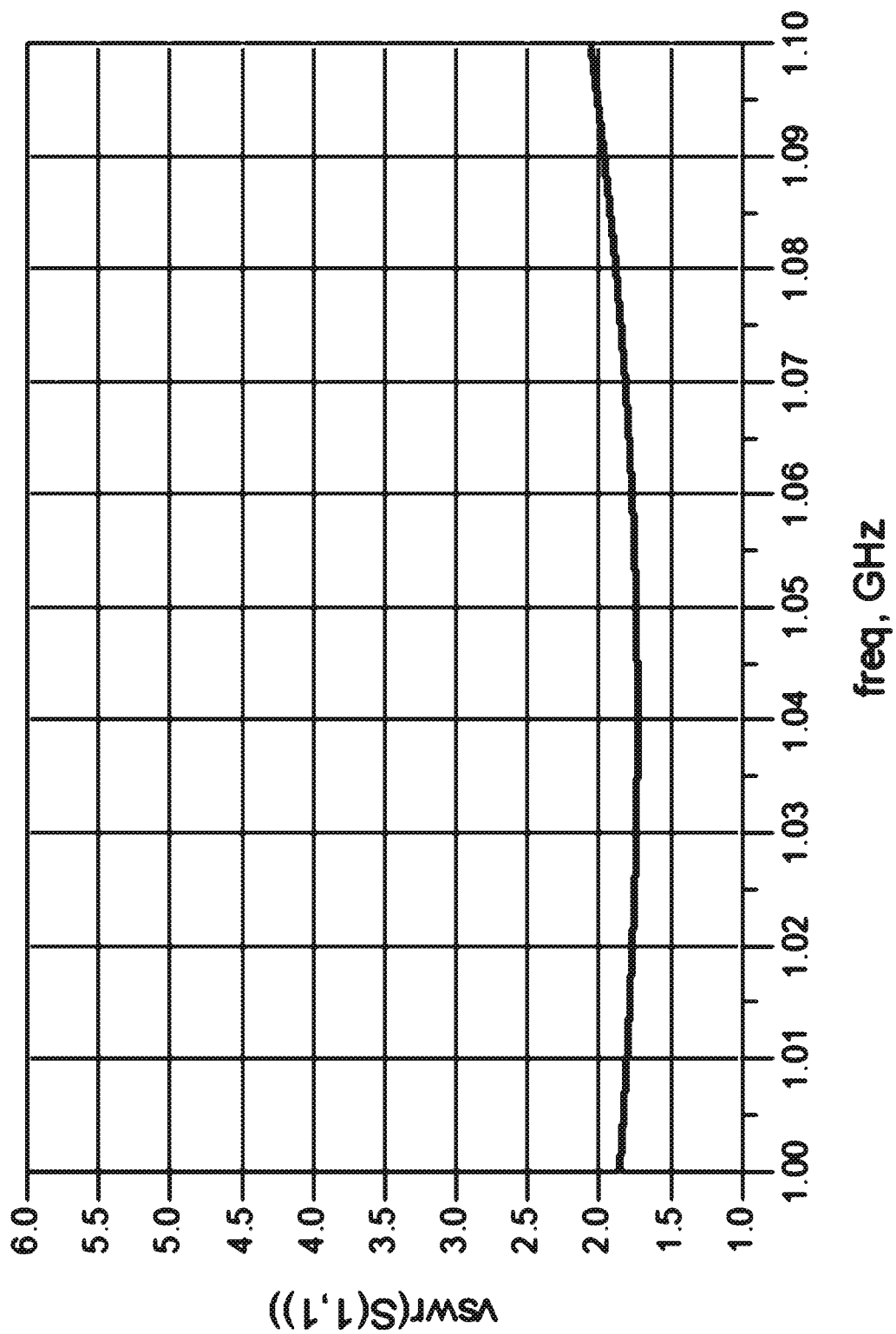
FIG. 9B is a graph showing typical VSWR values for the vertical IFF monopole antenna element of FIG. 6.

FIGS. 9A and 9B are graphs that illustrate the IFF radiation pattern and VSWR, respectively, for the embodiment of FIG. 6. For these graphs, the calculations assume a +3.8 dB peak gain and a VSWR of less than 2:1.

With reference to FIG. 10, the assembly 600 of FIGS. 2A and 2B can be configured as a blade antenna 1000 that can replace an existing IFF blade antenna. In the embodiment of FIG. 10, the blade is 3.8 inches wide, 7.74 inches long, and 9.75 inches tall.

Figure 11:
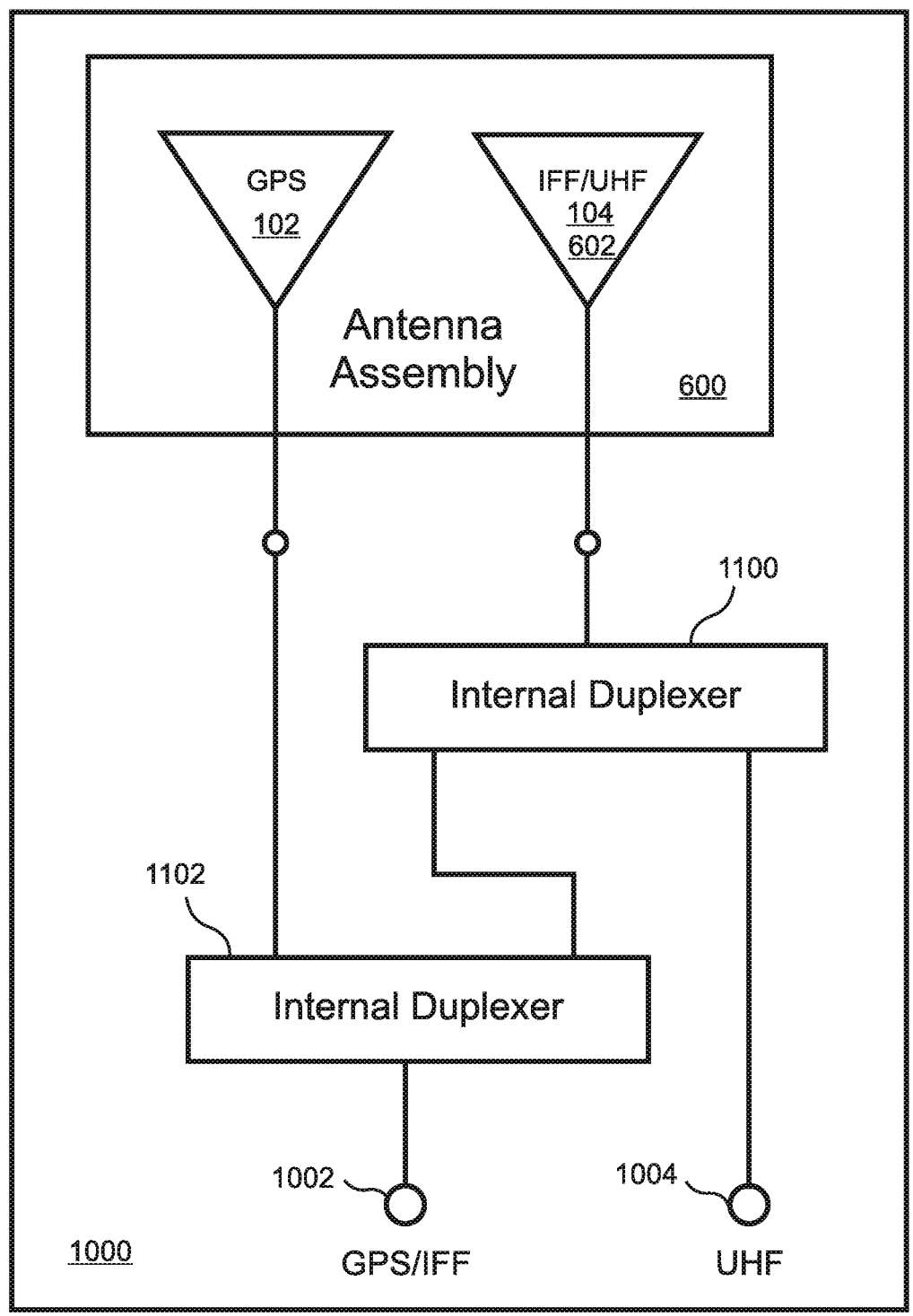
FIG. 11 is a block diagram illustrating a wireless communication system that includes the antenna assembly of FIG. 6 configured with a first connector that is shared by a diplexer between the IFF and GPS antenna elements, and a second connector that is dedicated by the diplexer to the UHF antenna element.

In some embodiments, the UHF antenna element is directed to a separate rf connector, while the IFF and GPS elements share a connector. In the embodiment of FIG. 10, and with reference also to FIG. 11, a pair of internal diplexers 1100, 1102 are provided within the blade 1000 that enable the GPS 102 and IFF 104 antenna elements to share one connector 1002, while the other connector 1004 is dedicated to the UHF antenna element 602. In the embodiment of FIG. 11, an integrated GPS low noise amplifier is included at the input to the GPS aperture, and GPS blanking is implemented so that the IFF power does not couple directly to the GPS receiver. Due to the GPS blanking, additional isolation filtering is not required to isolate the GPS and IFF channels in this embodiment. A low pass filter is integrated within the IFF/UHF diplexer 1100 to assure isolation between the UHF and GPS channels.

Figure 12:
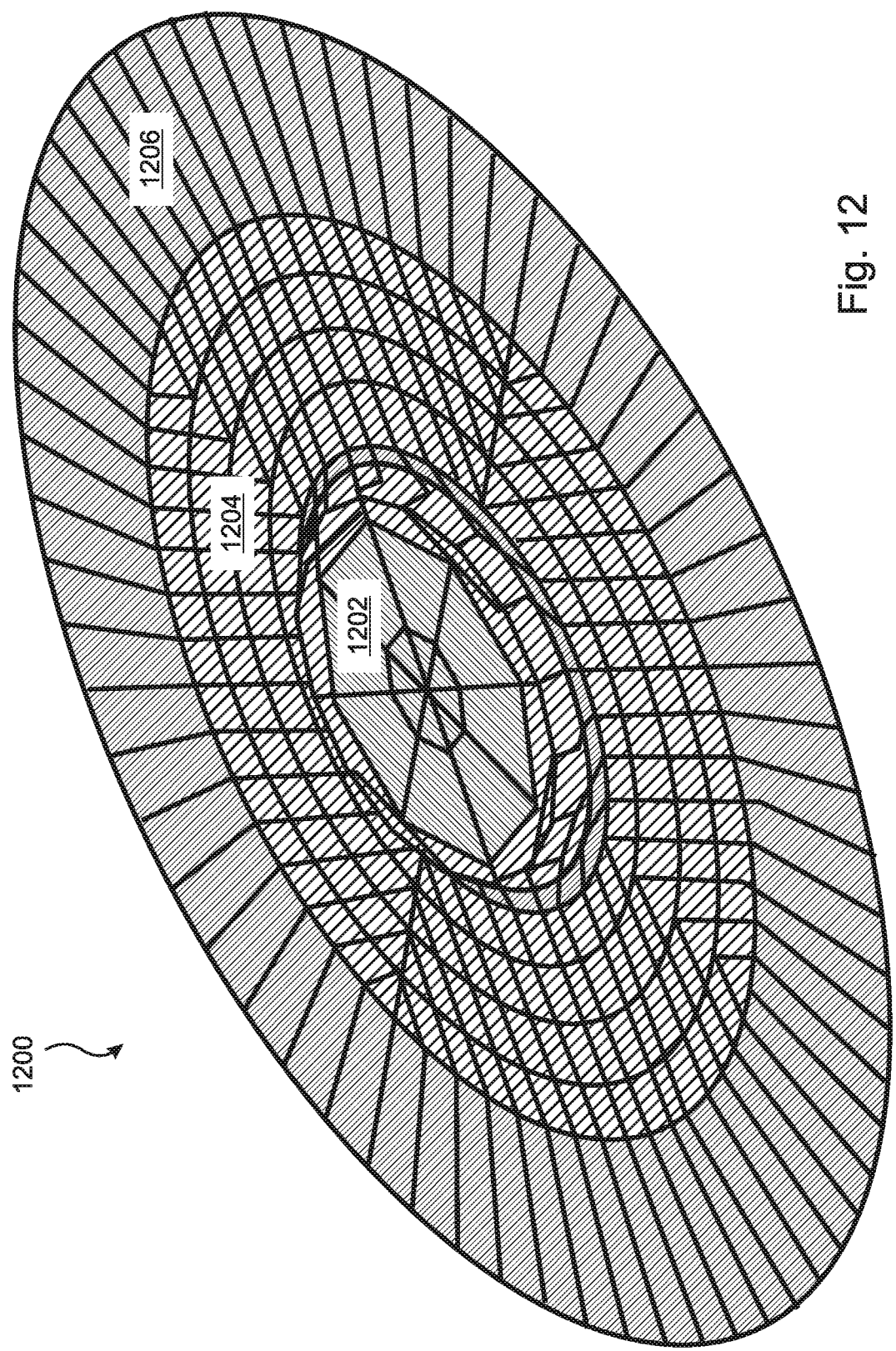
FIG. 12 is a perspective view of an embodiment in which the IFF antenna element is an annular slot IFF transponder antenna element that is centered on the GPS patch antenna element.

With reference to FIG. 12, in other embodiments, the antenna assembly 1200 includes an IFF element that is an annular slot IFF transponder antenna element 1202 that is centered on the GPS patch antenna element 1204 surrounded by an annular base 1206.

In the embodiment of FIG. 12, the GPS patch 1204 can receive signals in both the L2 (1216 MHz through 1240 MHz) band and the L1 (1565 MHz through 1585 MHz) frequency band, with a VSWR of less than 1.5:1 for each band. The polarization is right hand circular (RHCP) with an omni-azimuth pattern having maximum gain at the zenith.

In the embodiment of FIG. 12, the IFF antenna element 1202 can receive signals in the 1220 MHz through 1040 MHz frequency range, and transmit signals in the 1080 MHz through 1100 MHz frequency range. The VSWR is less than 1.5:1 for each of these ranges. The polarization of the IFF antenna element 1202 is vertical, with an omni-azimuth pattern having maximum gain substantially at the horizon.

Each of the antenna elements 1202, 1204 is directed to a separate RF connector. The base 1206 is approximately seven inches in diameter and the assembly 1200 is about one inch deep, with a slight protrusion above the outer surface of approximately 0.5 inches. Embodiments are fully conformal to the outer surface upon which the antenna assembly is mounted.

Calculated IFF/GPS parameters for the embodiment of FIG. 12 are presented in Table 1 below.

TABLE 2

IFF/GPS coupling for the embodiment of FIG. 12

| | IFF (1090 MHz) | GPS (1575 MHz) |
|---|---|---|
| Input power to Transponder Port | +58 dBm | +58 dBm |
| Transponder Spectral Loss | 0 dB | 70 dB |
| Transponder antenna loss | 1.0 dB | 30 dB |
| GPS Antenna Loss | 10 dB | 1 dB |
| Coupling Loss | 10 dB | 10 dB |
| GPS Mode Former Loss | 25 dB | 35 dB |
| Output Power from GPS Port | +12 dBm | −71 dBm |
| GPS Band-Pass Filter | 30 dB | 0 dB |
| Transponder Band-Pass Filter | 0 dB | 35 dB |
| Input to GPS Receiver | −18 dBm | −106 dBm |

Figure 13A:
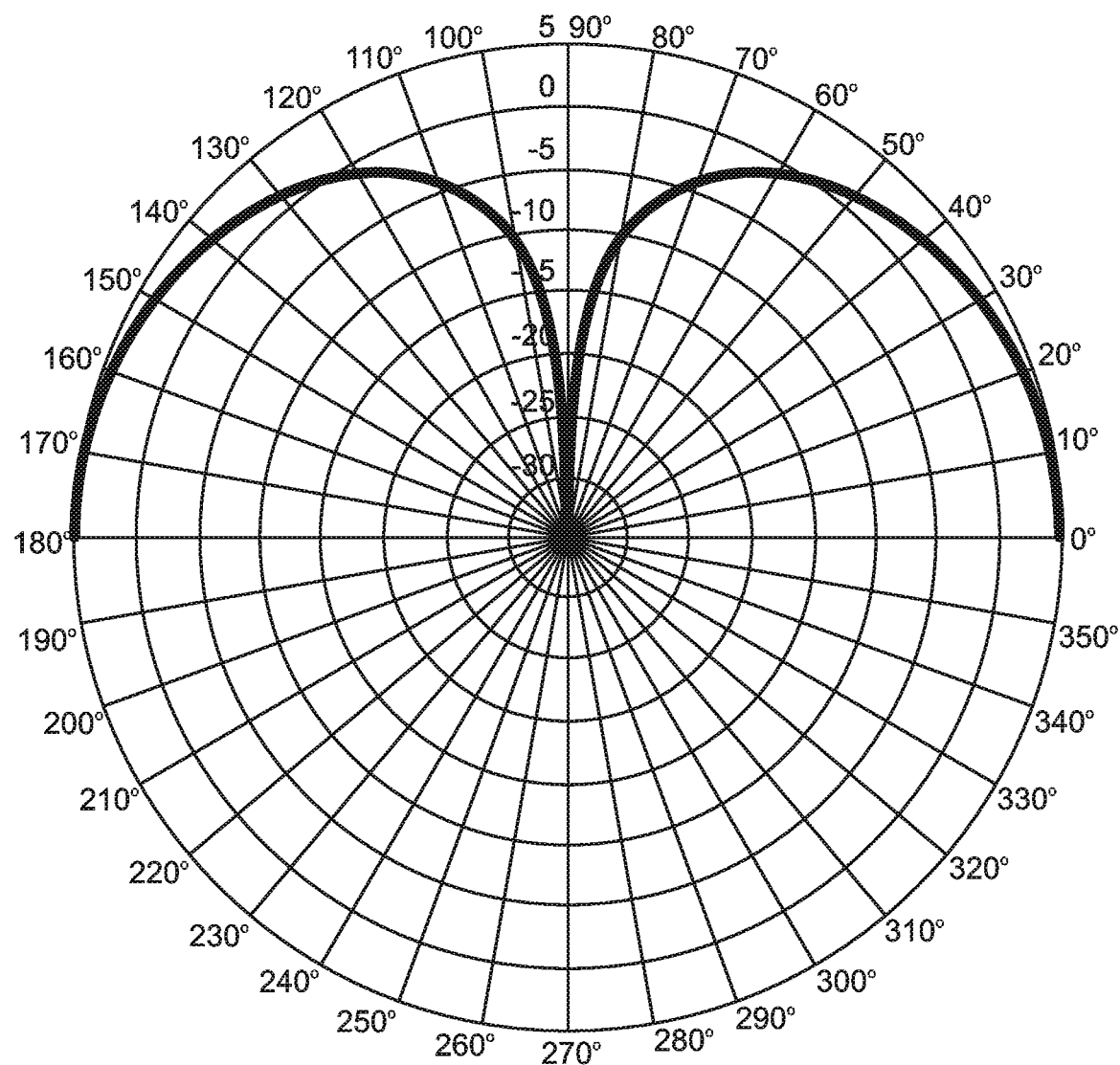
FIG. 13A is a graph showing a typical elevation plane radiation pattern for the vertical IFF antenna element of FIG. 12.
Figure 13B:
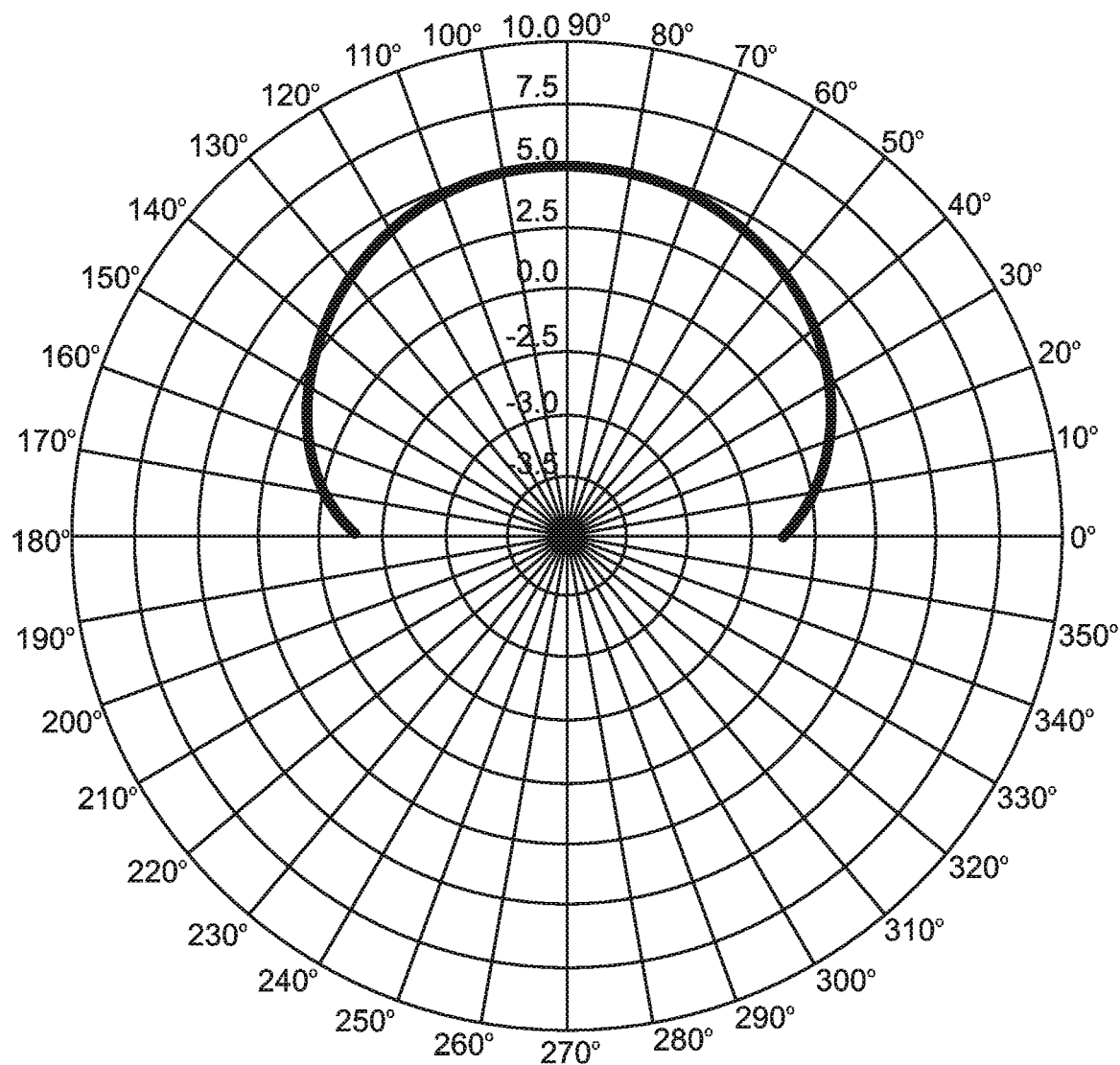
FIG. 13B is a graph showing a typical elevation plane radiation pattern for the horizontal GPS patch antenna element of FIG. 12.

FIGS. 13 and 14 present radiation pattern calculation patterns for the IFF 1202 and GPS 1204 antenna elements of FIG. 12, respectively. In FIG. 14, the L2 band was modeled. Performance for the L1 band is similar. The gains for the figures, allowing for 1.5 dB transmission loss, are 3.5 dBi for the IFF antenna element 1202 (FIG. 13) with VSWR less than 2.0:1, and 3.5 dBic for the GPS antenna element 1204 (FIG. 14) with VSWR of less than 1.5:1.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. An antenna assembly for wireless communication at two radio frequencies F1 and F2, the assembly comprising:
    a horizontal patch antenna element configured for communication over a second frequency range that includes F2 but not F1, the horizontal patch antenna having circular polarization and an omni-azimuth gain pattern that is maximal substantially at its horizon; and
    a first vertical antenna element extending upward from a center of the horizontal patch antenna element and configured for communication over a first frequency range that include F1 but not F2, the first vertical antenna element having vertical polarization and an omni-azimuth gain pattern that is maximal substantially at its zenith,
    wherein F1 is between 1000 MHz and 1200 MHz, and F2 is between 1200 MHz and 1600 MHz.

2. The antenna assembly of claim 1, wherein the first vertical antenna element is a vertical monopole antenna element.

3. The antenna assembly of claim 2, wherein the antenna assembly is configured as a blade for installation on a vehicle as a replacement for an existing blade antenna that is optimized for wireless communication within a frequency range that does not include both F1 and F2.

4. The antenna assembly of claim 2, further comprising a second vertical monopole antenna element co-linear with the first vertical monopole element and configured for optimal communication at a frequency F3 that is lower than F1 and F2, the second vertical monopole antenna element having vertical polarization and an omni-azimuth gain pattern that is maximal substantially at its zenith.

5. The antenna assembly of claim 4, wherein the first vertical monopole antenna element is between the horizontal patch antenna element and the second monopole antenna element.

6. The antenna assembly of claim 4, wherein the second vertical monopole antenna element is between the horizontal patch antenna element and the first monopole antenna element.

7. The antenna assembly of claim 4, wherein F3 is between 200 MHz and 400 MHz.

8. The antenna assembly of claim 4, further comprising a diplexer that provides access to the horizontal patch antenna element and the first vertical monopole antenna element via a first connector, and to the second vertical monopole antenna via a second connector.

9. The antenna assembly of claim 1, further comprising a first connector cooperative with the horizontal patch antenna element and a second connector cooperative with the first vertical antenna element.

10. The antenna assembly of claim 1, further comprising an RF amplifier integral with the antenna assembly and cooperative with the horizontal patch antenna.

11. The antenna assembly of claim 1, further comprising:
    a diplexer integral with the antenna assembly and cooperative with both the horizontal patch antenna element and the first vertical antenna element; and
    a connector that is cooperative with the diplexer.

12. The antenna assembly of claim 1, wherein the first vertical antenna element is an annular slot transponder antenna element that is centered on the GPS patch antenna element.

13. The antenna assembly of claim 12, wherein the antenna assembly is fully conformal to a surface upon which the antenna assembly is mounted.

14. A wireless communication system configured for communication at two radio frequencies F1 and F2, the system comprising:
    an antenna assembly according to claim 1;
    a receiver having a receiver input in communication with the horizontal patch antenna element and configured for receiving signals at frequency F1; and
    a first transceiver in communication with the first vertical antenna element and configured for transmitting and receiving signals at frequency F2;
    wherein the receiver is configured to receive GPS signals, and the first transceiver is configured to send and receive IFF signals.

15. The system of claim 14, further comprising:
    a first bandpass filter interposed between the horizontal patch antenna element and the receiver input, the first bandpass filter being tuned to pass only frequencies in a first filter range that includes F1 but not F2; and a second bandpass filter interposed between the first vertical antenna element and the first transceiver, the second bandpass filter being tuned to pass only frequencies in a second filter range that includes F2 but not F1.

16. The system of claim 14, further comprising a blanking apparatus that is able to block the receiver input while the first transceiver is transmitting energy at frequency F1.

17. The system of claim 14, further comprising:

a second vertical monopole antenna element co-linear with the first vertical monopole element and configured for optimal communication at a frequency F3 that is lower than F1 and F2, the second vertical monopole antenna element having vertical polarization and an omni-azimuth gain pattern that is maximal substantially at its zenith; and a second transceiver in communication with the second vertical antenna element and configured for transmitting and receiving signals at frequency F3.

18. The system of claim 17, wherein the second transceiver is configured to send and receive UHF signals.

19. An antenna assembly for wireless communications with at least two radio frequencies F1 and F2, the assembly comprising:

a horizontal patch antenna element configured for communication over a second frequency range that includes F2 but not F1, the horizontal patch antenna having circular polarization and an omni-azimuth gain pattern that is maximal substantially at its horizon; and a first vertical antenna element extending upward from a center of the horizontal patch antenna element and configured for communication over a first frequency range that include F1 but not F2, the first vertical antenna element having vertical polarization and an omni-azimuth gain pattern that is maximal substantially at its zenith;

wherein the first vertical antenna element is a vertical monopole antenna element, and wherein the antenna assembly is configured as a blade for installation on a vehicle as a replacement for an existing blade antenna that is optimized for wireless communication within a frequency range that does not include both F1 and F2.

20. The antenna assembly of claim 19, wherein the first vertical antenna element is an annular slot transponder antenna element that is centered on the GPS patch antenna element.

* * * * *